United States Patent
Ghosh et al.

(10) Patent No.: US 12,106,074 B2
(45) Date of Patent: *Oct. 1, 2024

(54) SYSTEMS AND METHODS FOR CREATING SOFTWARE

(71) Applicant: Engineer.ai Corp, London (GB)

(72) Inventors: Siddhartha Ghosh, London (GB);
Sarvaswa Tandon, London (GB);
Ralph Bourdoukan, London (GB);
Sachin Dev Duggal, London (GB);
Rohan Patel, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,260

(22) Filed: Feb. 1, 2023

(65) Prior Publication Data

US 2023/0168870 A1    Jun. 1, 2023

Related U.S. Application Data

(63) Continuation of application No. 17/348,695, filed on Jun. 15, 2021.
(Continued)

(51) Int. Cl.
*G06F 8/30* (2018.01)
*G06F 8/20* (2018.01)
(Continued)

(52) U.S. Cl.
CPC ............. *G06F 8/316* (2013.01); *G06F 8/20* (2013.01); *G06F 8/36* (2013.01); *G06F 8/71* (2013.01);
(Continued)

(58) Field of Classification Search
CPC ... G06F 8/20; G06F 8/316; G06F 8/36; G06F 8/71; G06Q 10/06311; G06Q 30/0283
(Continued)

(56) References Cited

U.S. PATENT DOCUMENTS 6,016,394 A    1/2000    Walker
6,697,824 B1   2/2004    Bowman-Amuah
(Continued)

FOREIGN PATENT DOCUMENTS

CN    102880455    1/2013
CN    107346249    11/2017
(Continued)

OTHER PUBLICATIONS

Sharlene Aminullah, "Cost Estimation of Service Delivery in Cloud Computing", Aug. 2012, Arjuna Technologies Ltd., 95 pages (Year: 2012).
(Continued)

*Primary Examiner* — Ted T. Vo
(74) *Attorney, Agent, or Firm* — Fox Rothschild LLP

(57) ABSTRACT

An online software development platform providing an integrated resource for design, development, and purchase of customer-desired software applications for software projects created by customers. The platform comprising one or more computers configured using computer readable instructions stored in non-transitory computer memory to provide the software development platform, wherein the software development platform is configured to implement a plurality of electronic operational domains providing user-interactive capabilities or internal functionalities of the software development platform. The domains comprising a project scope process, a pricing process, and a project development process. The platform is configured to use a configuration involving knowledge graph to recommend features.

20 Claims, 55 Drawing Sheets

Related U.S. Application Data

(60) Provisional application No. 63/039,968, filed on Jun. 16, 2020.

(51) Int. Cl.
  *G06F 8/36* (2018.01)
  *G06F 8/71* (2018.01)
  *G06Q 10/0631* (2023.01)
  *G06Q 30/0283* (2023.01)

(52) U.S. Cl.
  CPC ... *G06Q 10/06311* (2013.01); *G06Q 30/0283* (2013.01)

(58) Field of Classification Search
  USPC .................................................. 717/101–109
  See application file for complete search history.

(56) References Cited

U.S. PATENT DOCUMENTS

| | | |
|---|---|---|
| 7,536,676 B2 | 5/2009 | Baker et al. |
| 7,783,523 B2 | 8/2010 | Lopez et al. |
| 8,144,619 B2 | 3/2012 | Hoffberg |
| 8,146,053 B2 | 3/2012 | Morrow et al. |
| 8,365,018 B2 | 1/2013 | McIntosh et al. |
| 8,413,062 B1 | 4/2013 | Little |
| 8,458,009 B1 | 6/2013 | Southworth |
| 8,621,423 B2 | 12/2013 | Knight et al. |
| 8,640,027 B2 | 1/2014 | Chandhoke et al. |
| 8,893,212 B2 | 11/2014 | Reisman |
| 8,997,038 B2 | 3/2015 | Bozek et al. |
| 9,129,038 B2 | 9/2015 | Begel et al. |
| 9,268,544 B2 | 2/2016 | Kang et al. |
| 9,286,040 B2 | 3/2016 | Halley et al. |
| 9,342,623 B2 | 5/2016 | Narayanan et al. |
| 9,477,779 B2 | 10/2016 | Webber et al. |
| 9,563,407 B2 | 2/2017 | Salter |
| 9,753,960 B1 | 9/2017 | Troyanovsky |
| 9,886,247 B2 | 2/2018 | Laredo et al. |
| 10,296,308 B2 | 5/2019 | Lance |
| 10,469,741 B2 | 11/2019 | Ishibashi |
| 10,521,199 B2 | 12/2019 | Ganesan et al. |
| 10,540,153 B2 | 1/2020 | Stachura |
| 10,649,741 B2 | 5/2020 | Duggal |
| 10,776,965 B2 | 9/2020 | Stetson et al. |
| 10,798,028 B2 | 10/2020 | Fung et al. |
| 11,086,599 B2 | 8/2021 | Duggal et al. |
| 2003/0018952 A1 | 1/2003 | Roetzheim |
| 2005/0066304 A1 | 3/2005 | Tattrie et al. |
| 2006/0259442 A1 | 11/2006 | Iqbal |
| 2008/0004844 A1 | 1/2008 | Kefford |
| 2008/0235155 A1 | 9/2008 | Thywissen |
| 2009/0037287 A1 | 2/2009 | Baitalmal et al. |
| 2011/0088011 A1 | 4/2011 | Ouali |
| 2011/0271246 A1 | 11/2011 | Fujihara |
| 2011/0276354 A1 | 11/2011 | Bijani et al. |
| 2012/0331439 A1 | 12/2012 | Zimmermann et al. |
| 2014/0173454 A1 | 6/2014 | Sanchez |
| 2014/0330867 A1 | 11/2014 | Sarkar et al. |
| 2016/0055079 A1 | 2/2016 | Hanna |
| 2016/0092179 A1 | 3/2016 | Straub |
| 2016/0139888 A1 | 5/2016 | Iyer et al. |
| 2017/0221240 A1 | 8/2017 | Stetson et al. |
| 2020/0057946 A1 | 2/2020 | Singaraju et al. |
| 2020/0125478 A1 | 4/2020 | Iyer et al. |
| 2020/0285450 A1 | 9/2020 | Das et al. |
| 2021/0149957 A1 | 5/2021 | Grossman et al. |
| 2021/0349695 A1 | 11/2021 | Duggal et al. |
| 2021/0390032 A1 | 12/2021 | Quaglio et al. |
| 2022/0004366 A1* | 1/2022 | Ghosh .................. G06F 8/71 |
| 2022/0236958 A1 | 7/2022 | Duggal et al. |
| 2022/0241548 A1 | 8/2022 | Duggal et al. |
| 2022/0244921 A1 | 8/2022 | Duggal et al. |
| 2022/0244922 A1 | 8/2022 | Duggal et al. |
| 2022/0244923 A1 | 8/2022 | Duggal et al. |
| 2022/0326914 A1 | 10/2022 | Duggal et al. |
| 2022/0342642 A1 | 10/2022 | Duggal et al. |
| 2023/0168869 A1* | 6/2023 | Ghosh .................. G06F 8/36 717/107 |
| 2023/0168870 A1 | 6/2023 | Ghosh et al. |
| 2023/0176825 A1* | 6/2023 | Ghosh ................ G06Q 30/0283 717/107 |
| 2023/0176826 A1* | 6/2023 | Ghosh ............... G06Q 10/06311 717/107 |
| 2023/0176827 A1* | 6/2023 | Ghosh ................ G06Q 30/0283 717/107 |
| 2023/0176828 A1* | 6/2023 | Ghosh .................. G06F 8/71 717/107 |
| 2023/0185542 A1* | 6/2023 | Ghosh ............... G06Q 10/06313 717/107 |
| 2023/0251830 A1* | 8/2023 | Ghosh ............... G06Q 10/06311 717/107 |

FOREIGN PATENT DOCUMENTS

| | | |
|---|---|---|
| CN | 110457031 | 11/2019 |
| CN | 110457313 | 11/2019 |
| CN | 110515614 | 11/2019 |
| CN | 111158670 | 5/2020 |
| JP | 2013-25612 | 2/2013 |
| KR | 101975272 | 5/2019 |
| WO | 2004102431 | 11/2004 |
| WO | 2015136607 | 9/2015 |
| WO | 2018005665 | 1/2018 |
| WO | 2021116471 | 6/2021 |

OTHER PUBLICATIONS

Nathan Curtis, "Modular Web Design—Creating Reusable Components for User Experience Design", 2010, Peachpit Press, 328 pages (Year: 2010).

International Search Report and Written Opinion, International Application No. PCT/EP2020/085866 mailed Mar. 31, 2021 (11 pages).

Notification of Transmittal of the International Search Report and the Written Opinion of the International Searching Authority, or the Declaration for International Application No. PCT/US2017/057030, International Filing Date Oct. 17, 2017, date of mailing Jan. 4, 2018, 6 pages.

Angel Puerta et al., "The UI Pilot: A Model-Based Tool to Guide Early Interface Design", 2005, ACM, pp. 215-222 (Year: 2005).

Bernaschina et al., "Formal Semantics of OMG's Interaction Flow Modeling Language (IFML) for Mobile and Rich-Client Application Model Driven Development," Elsevier, pp. 239-260 (2017).

Bernaschina et al., "Online Model Editing, Simulation and Code Generation for Web and Mobile Applications," IEEE, pp. 33-37 (2017).

Chen et al., "Wireframe-Based UI Design Search Through Image Autoencoder," Retrieved from the Internet: <https://arxiv.org/pdf/2103.07085vl.pdf> ACM Trans. Softw. Eng. Methodol., vol. 29, No. 3, Article 19, 31 pages (May 2020).

Dekkers, "Beyond Development: Estimating Model for Run & Maintain Cost," Software Measurement European Forum, Italy, pp. 249-264 (2007).

Al Asheeri and Hammad, "Machine Learning Models for Software Cost Estimation," 2019 International Conference on Innovation and Intelligence for Informatics, Computing, and Technologies (3ICT), 6 pages (2019).

\* cited by examiner

Full stack solution
S.I.M.B.A
The friendly A.I.
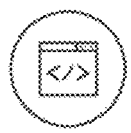 Engineer.ai
 Automated pricing
 Machine assisted product management
 Code creation
SD [S]QUARED ⓒ
FIG. 7

3. Project Development Process

After selecting product type user then selects the sub type of that product. The types are presented to the user as existing category leaders to better map to their understanding of what they want.

Product sub types are dynamic and are dependent on the product selection. This helps to easily narrow down the required product type to be built based on category, like products and eventually features.

Once a product category is selected the user must select a sub product to better describe what it is they want to build. Most selections have a unique set of features associated with them.

The user then selects which product they wish to begin development on.

The user then selects the product that is closest to the one they wish to build.

The user is now presented with an initial price based on both platforms that need to be built and the number or estimated screens. The price projection dynamically changes based on the user selections.

FIG. 27

The user is now presented with the default features that map to the type of application / product they selected. The user can select or deselect on a feature by feature basis. The price projection dynamically reflects this.

FIG. 29

The user can determine the time in which they require the development of the product. The price projection dynamically reflects this.

| Engineer.ai | What<br>Mobile Apps | Type<br>Yelp | | $41,020.00 |

Personalize your app

Pick a category, if you can't find what you are looking for "choose 'Something else'"
and we will connect you to a concierge straight away

| Speed |
|---|
| Platforms |
| Features |
| Teams |
| Select Speed |

ASAP  Take your time  It can wait
$58.00    $25.00        $19.00

( Next > )

FIG. 30

The user is now presented with different product development stages and their associated incremental cost.

| Engineer.ai | What<br>Mobile Apps | Type<br>Yelp | Platform<br>Android + iOS | | $41,020.00 |

Your Estimate

Deselect any phases you don't want i.e if you have designs already or want to skip prototyping. Costs shown are only for that section.

| Design | Prototype | MVP | Full Build |
|---|---|---|---|
| $100 | $200 | $300 | $1000 |
| Wireframes and designs | A clickable user demo | Core features to beta test | Your app, ready for launch! |

Next

FIG. 31

The user can select any combination of the product stages to be delivered. The price reflects this dynamically.

| Engineer.ai | What<br>Mobile Apps | Type<br>Yelp | Platform<br>Android + iOS | Phases | $47,000.00 |

Your Estimate
Deselect any phases you don't want i.e if you have designs already or want to skip prototyping. Costs shown are only for that section.

✓ Design — $100 — Wireframes and designs
✓ Prototype — $200 — A clickable user demo
✓ MVP — $300 — Core features to beta test
✓ Full Build — $1000 — Your app, ready for launch ( Next )

This administrative tool is available to the SD Squared staff to update any or all of the available application types, categories, features, platforms or any other setting in the selection flow. This allows for customization based on country or promotion origin. This view provides a snapshot of the total available in each section.

| Engineer AI Admin | | | Dashboard | dan@shsh.com | Log out |
|---|---|---|---|---|---|

Site Administration

NAVIGATION
- Applications
- Categories
- Features
- Platforms
- Screens
- Speeds
- Teams
- Users Dashboard » Dashboard

| Model name | Last used | Records |
|---|---|---|
| Applications | | 22 |
| Categories | | 3 |
| Features | | 16 |
| Platforms | | 5 |
| Screens | | 4 |
| Speeds | | 3 |
| Teams | | 2 |
| Users | | 3 |

SYSTEMS AND METHODS FOR CREATING SOFTWARE

CROSS REFERENCE TO RELATED APPLICATIONS

This is a continuation of U.S. patent application Ser. No. 17/348,695, filed Jun. 15, 2021, which claims priority to U.S. Provisional Patent Application Ser. No. 63/039,968, filed Jun. 16, 2020, the entirety of each of which is incorporated herein by reference in its entirety.

FIELD OF THE INVENTION

Embodiments of the present invention are related to the field of software development. Embodiments of the present invention are related to software development platform providing an integrated resource for design, development, and purchase of customer-desired software applications for software projects created by customers. Embodiments of the present invention are related to software development platforms having integrated advanced development aspects including machine learning to incorporate features into applications.

BACKGROUND

The present invention relates to software application development systems and improving the effectiveness, speed, and operation of software application development. Software development is its own field of endeavor and a significant industry exists directed to software development tools and software development. Typically, a company seeking a new application can engage a software developer to develop the new software application for based on specifications or other methodology.

As generally understood, the conventional approach for developing a custom software application is to engage designers to develop the interface designs, the visual components, and software developers to implement the customer requirements for the software application including the design aspect into working source and object code (e.g., adapted for selected operating systems). The interactions with the software developer may involve initial conversations, artwork, or input from designers, source code developers, and customers. The interaction can result in deficiencies in efficiency, pricing, implementation, and consistency.

This process can often times result in projects dying because of the complexity and the extended time for development. Techniques for improving this process, which can improve the design and development process and provide greater efficiencies for vendors and customers along with the platform, are desired.

Conventional systems lack robustness in the provided tools that can reliably improve the design creation a new customer application and improve the efficiency of the build.

Overall, there can be one or more technical problems related to software development.

SUMMARY OF THE INVENTION

According to embodiments of the present invention, an online software development platform providing an integrated resource for design, development, and purchase of customer-desired software applications for software projects created by customers can be provided. A platform with fewer or additional features are contemplated in some embodiments. The platform can form example comprise one or more computers configured using computer readable instructions stored in non-transitory computer memory to provide the software development platform, wherein the software development platform is configured to implement a plurality of electronic operational domains providing user-interactive capabilities or internal functionalities of the software development platform.

The domains can comprise a project scope process that is configured to provide a user with the ability through interactive display screens to specify and accept a scope for the software project, wherein as part of the project scope process through interactive screens the user creates a project and selects a plurality of features to be in the project; a pricing process that is configured to evaluate the software project and determine price for the delivery of a software application for the software project; and a project development process that is configured to selectively assign one or more elements of the software project, including one or of the selected features for the project, to developers and manage and track the development process.

The software development platform is configured to collect data from activity in the project scope process, pricing process, and project development process in accordance with platform-defined graph data structures, wherein the graph data structures comprising (a) a plurality of different types of nodes representing entities, the node types comprising template, project, and feature, each node type having a set of defined attributes, and different types of edges that represent interrelationship between entities.

The software development platform is configured to generate and store a graph database comprising the nodes and edges created from the collected data in the operation of software development platform and configured to reuse existing nodes and edges, add new nodes and edges, and adjust individual attributes of existing nodes and edges, wherein the graph database represents via nodes and edges an aggregation of the software projects conducted on the software development platform and related information and is updated to include new software projects using collected data.

The software development platform is configured to, in response to a query of the nodes and edges, control one or more parts of the operation of the platform.

The software development platform can be configured to traverse nodes and edges and stop travel to identify one or paths comprising connected node and edge paths in the graph database in accordance with a graph traversal algorithm, wherein the platform stops traversal when a criterion of the algorithm is not found.

The software development platform wherein the platform is configured, in response to the query, to control a user interaction in the project scoping process comprising displaying an option that suggests a feature to include based on the structure of the graph database.

The software development platform wherein the platform comprises a knowledge graph process wherein the platform is configured to continuously collect data and add nodes and edges to the graph database using the collected data, store the graph database in a first location, periodically perform a script that copies the graph database, loads the copied graph database to a second location, and interacts with the copied knowledge graph as part of the operation of the project scope process to provide software tools based on the knowledge graph.

The software development platform wherein the platform is configured to include embedding generation that generates an embedding comprising a plurality of n-dimensional vectors that in accordance with an embedding algorithm represent the graph database, each n-dimensional vector corresponding to a node in the graph database and comprising vector values based on relationship to other nodes in the graph database.

The software development platform wherein the platform is configured to store a plurality of different hyper parameters corresponding to different software tools on the platform.

The software development platform wherein the platform is configured to control the embedding generation with the hyper parameters and generate different and store different embeddings corresponding to different software tools.

The software development platform wherein the query is applied to the embedding to generate an output for the control of an operation, display, or recommendation.

The software development platform wherein the software tool suggests a feature to add to the software project based on the embedding.

Other controls and tools are contemplated.

Embodiments of the present invention include methods (including related systems or computer readable medium) for creating software. Such embodiments can include receiving input from a customer, by a server running a software creating component, the input describing at least one aspect of a software program, determining, by the software creating component based on the input, existing code components that may be used to create the software program, the existing code components being stored in a code library accessible by the software creating component, determining, by the software creating component based on the user input and based on the existing code components that may be used to create the software program, new code components that must be developed for the software program, and providing, by the software creating component to the user, a cost estimate for the software program based on the existing code components that may be used and based on the new code components that must be developed. The methods can include adjusting the cost estimate based on the at least one aspect of the software program. The methods can include at least one aspect of the software program including at least one of: a platform category, an application template, a requirement collection, a platform, a number of screens, a feature, a team location, a time to market, and a build depth. The build depth can include a wireframe, a design, a navigable prototype, a minimal viable product, or a complete project. The methods can include sending, by the software creating program, a set of existing code requirement and a set of new code requirements to a team selector, and generating, by the software creating program, a build card based on the existing code components that may be used and based on the new code components that must be developed. The methods can include generating, by the software creating program, a project schedule based at least in part on the build card, the project schedule including events related to the creation of the software program, and managing, by the software creating program, the events related to the creation of the software program. The events related to the creation of the software program including at least one of: a project milestone; a code commit; and a customer message. The methods further comprising passing, by the software creating program, at least one event ID to a communication program, and sending, by the communication program, a message to the customer based on the event ID. The methods can include receiving, by a communication program, a message from the customer; and parsing, by the communication program, the received message into the software creating program.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIGS. 5-10 describe and illustrate aspects of the problem and the solution to the problem provided by embodiments of the systems and methods;

FIGS. 18-37 describe and illustrate a user experience and flow using screenshots from a user interface of an embodiment for creating software;

Figure 39:
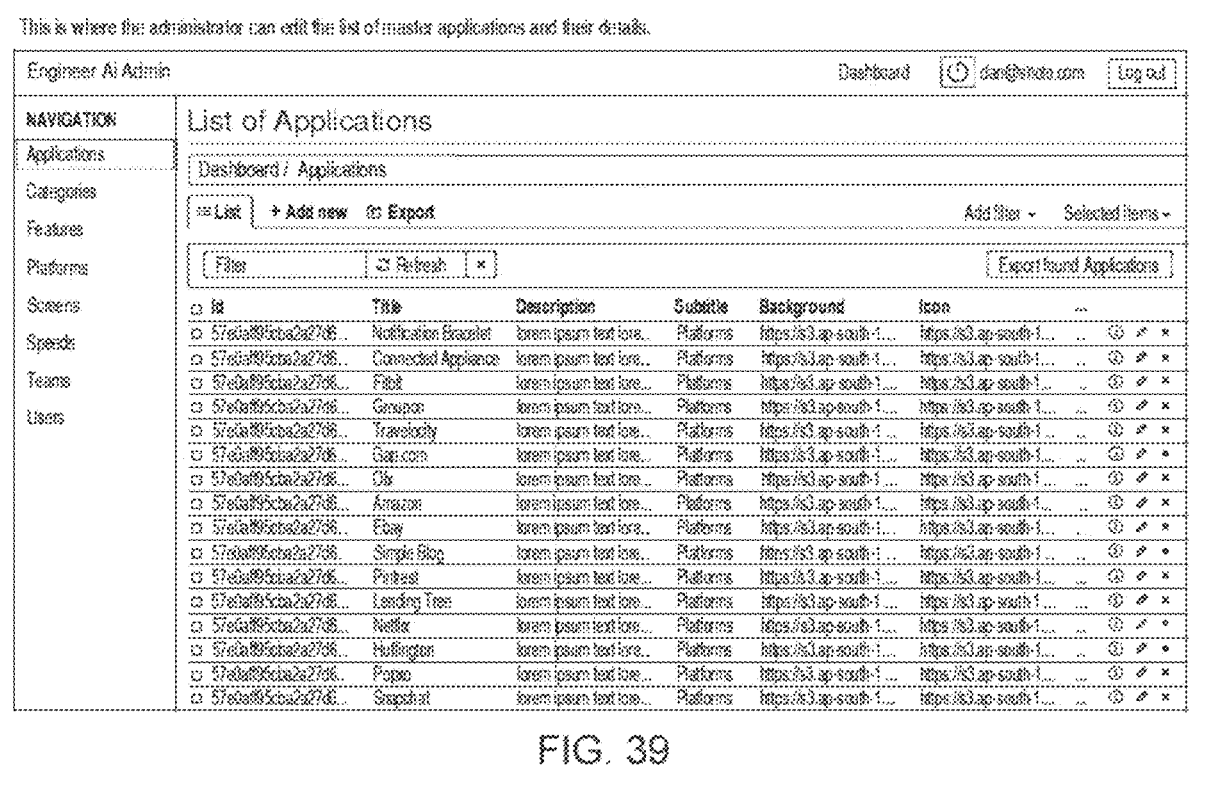
Figure 40:
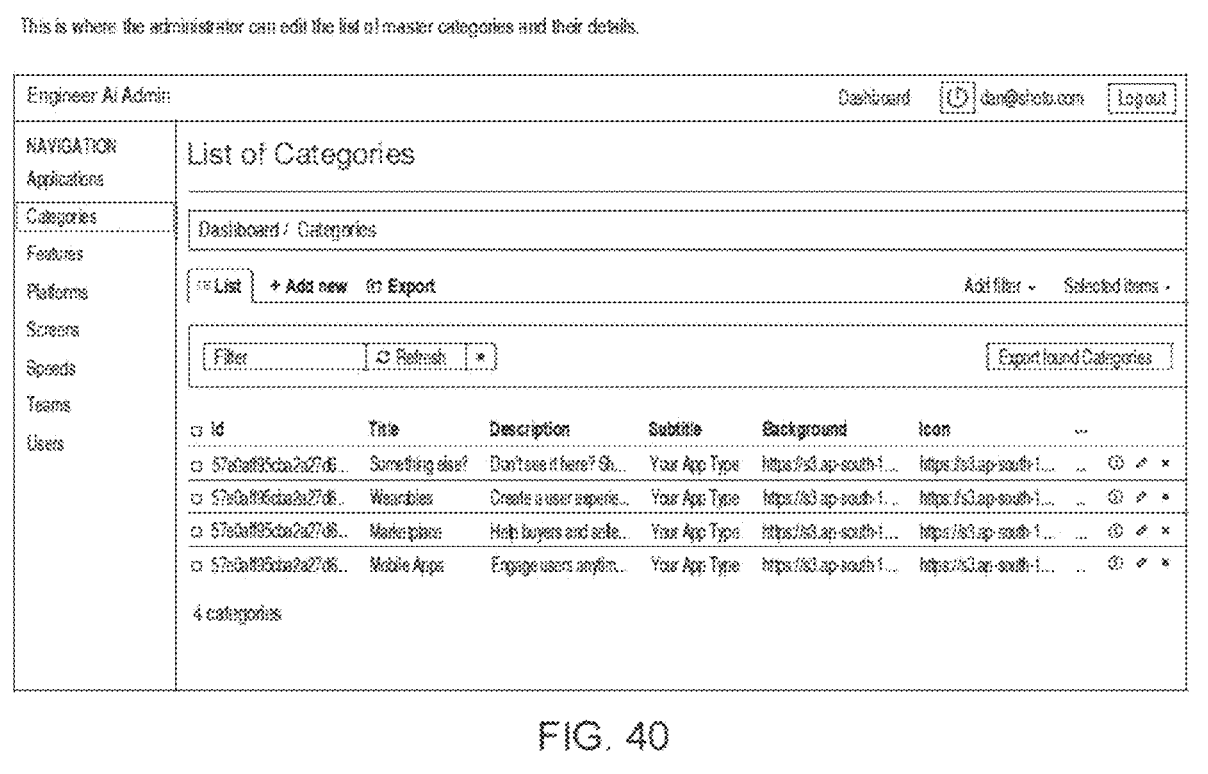
Figure 41:
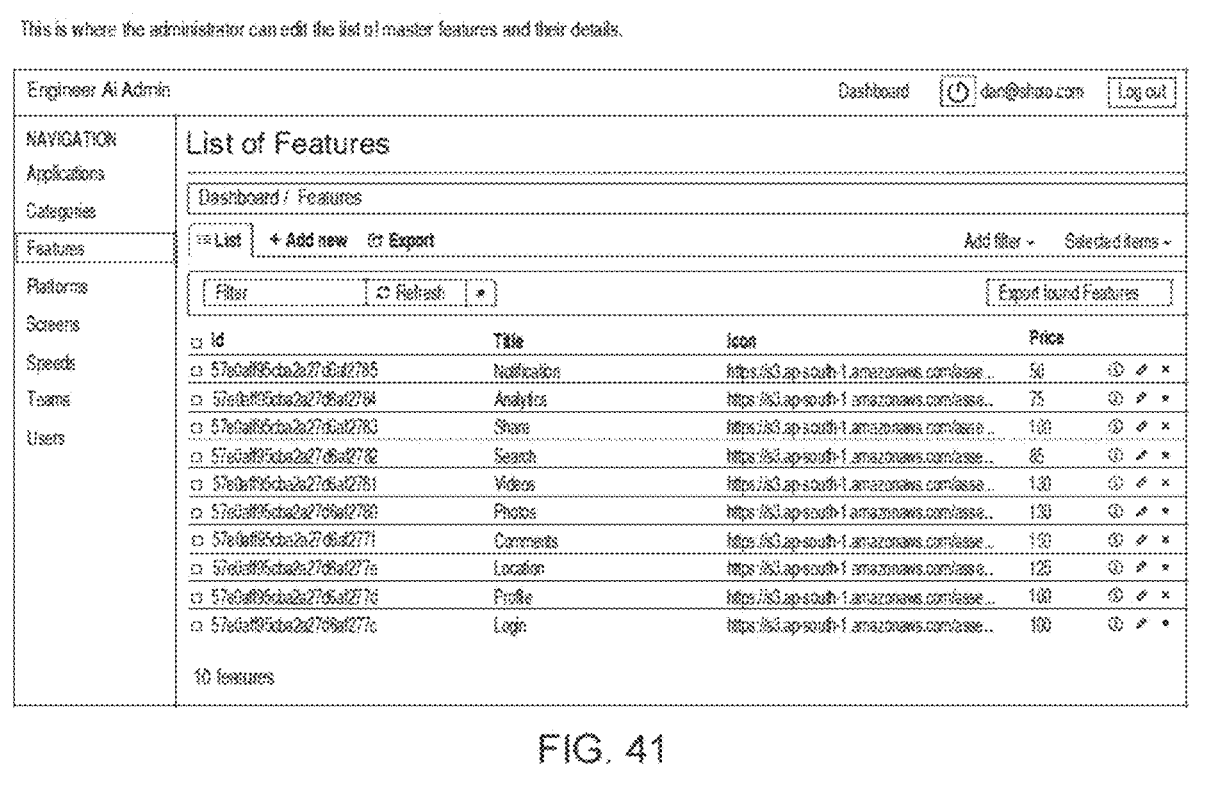

FIGS. 38-43 describe and illustrate an administrative user interface and flow using screenshots of an embodiment for creating software;

Figure 1:
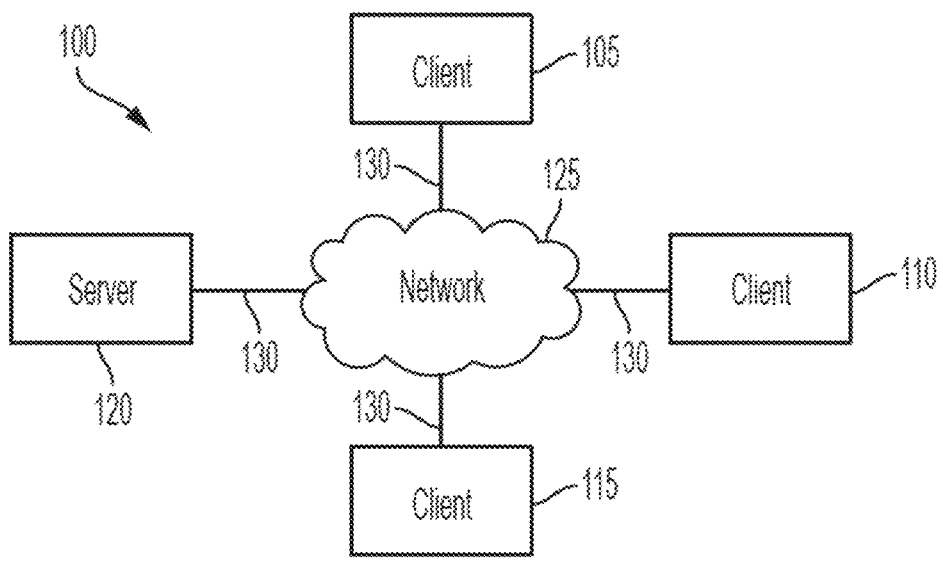
FIG. 1 is a simplified block diagram of a distributed computer network according to an embodiment of the present invention.

Certain examples and embodiments have other features that are one of in addition to and in lieu of the features illustrated in the above-referenced figures. These and other features are detailed below with reference to the above-referenced figures.

DETAILED DESCRIPTION OF THE INVENTION

Embodiments of the present invention disclose a system and method that automate aspects of developing software applications. Embodiments of the present invention involve creating a graph or graph database that involves a computer system that is configured to collect discrete information as defined nodes and edges as part of this process. For example, a software development platform can be configured to include an interactive online interface for receiving a customer software application project and engage in that process to completion. The platform can provide an engagement process in which the customer through interactive software interactions (or possibly sometimes human interaction in some instances) can specify the functionality and operating characteristics of the desired software application. The platform can include selected features, manually or automatically, that work through the software development process with the customer and is configured to operate to develop the software for the customer through the use of a team of software developers and other included software and hardware infrastructure. In some embodiments, the platform is configured to automatically generate the software application or to combine the use of developer with the automatic generation of the software application.

The platform can handle different types or categories of applications and be configured to accept, for example, many projects. An advancement that can make a material and significant improvement is that the platform can be configured with defined nodes and edges that correspond to entities and relationship. The nodes and edges are used to create a graph database representing the information that is being collected by the software application development platform. The resulting graph database provides more advanced, faster, granular, predictive, and more accurate system for tools or features within the software development field and the platform. The structure of the graph schema and graph database provides improvements in speed such as to provide real time responses that are not otherwise possible using conventional solutions in this field of technology (software development platforms). This incorporation materially improves the functionality of the platform and the development process through capitalizing in identifying valuable pathways and interrelationships that are discovered from the graph.

As illustrated herein as examples which can by themselves be particularly suitable for use. Nodes can be defined by the platform for example as the following types: template, build card, developer, feature, problem statement, and CPE/CTE (client product expert/client technical expert). Nodes can have predefined attributes such as complexity, price, or time, the value for which can be added to the node by the platform based on customer interaction, by an automated process, or by tracking actual performance such as tracking a project and automatically entering the time when a feature was completed. Edges can be defined to describe a limited set of relationships between nodes. A limited set of edges can be defined to categorize different types of node-node interrelationships. Illustrative or examples of information is provided in the figures of edges, which can also be particularly valuable in implementation. This structure of nodes and edges can allow the platform to automatically and in a uniformly consistent way ingest the (end to end) software development process (including a range of attributes such as prices, timeline, skills, etc.) as carried out through the platform and are quickly defined for progress in to the next phase of development.

The platform through aggregation creates, stores, and updates the graph database including the nodes and edges as per the defined characteristics of the nodes and edges. The resultant graph through aggregation can result in a highly valuable resource in improving the platform and software development such as by providing software applications that have fewer bugs.

The system can be configured to permit different types of software queries and propagation to provide different features such as to automate platform features and support software development and platform operation. For example, as shown herein, a feature can define a node and a range of software features can be saved as nodes in the graph database. The system can store edges, among which it can store edges that specify that each project has an edge to another feature node when those two feature were included in the same software development project. This can for example be accumulated for many projects (e.g., thousands, hundreds of thousands, etc.). Because each project may include many different features, the resulting node interrelationship can be complex in a large order of magnitude. The features can have edges to other types of nodes such as developer nodes for the specific developer that developed that feature for that project.

As a base case, the node/edge relationship captured for features in projects can be queried. For example, a potential new project has been selected (e.g., by a client) to include three different features from a menu to be included in the client's project. The platform can query the graph database and the selected features can be applied as a query to the graph database that in response will for example traverse only through paths that includes the select three nodes, and will further traverse those subgraphs in the found paths that contains the three nodes to identify other nodes that are connected to all three of those nodes (when all three of those nodes were included in another project). A query to the graph database can also involve a query to an embedding generated from the graph database and representing the graph structure in computer operationally simpler construction. The query may further establish an algorithm that may filter nodes that are found through the traversal to a set that meets a threshold (e.g., this fourth node was included every time these three nodes were include, or this fourth node was include a large percentage of the time) indicating a likelihood of valuable software development and functional affiliation. To amplify, this can involve 10 selected features and can also include variations where the query is varied to find any 9 of the selected features and then identify the related nodes in that path for use in the platform as a suggestion or automatic incorporation. Other analysis at the same level or more complex can be obtained quickly with reliable predictions based on the aggregated graph and the values of nodes and edges. One intuitive value is that providing reliable information to clients can provide higher level of credulity and trust. It can also provide better software performance since available features (catalogue of features on the platform) are automatically scored and included in proper association (such as for a particular new project).

If desired, the system may have a visual interface that permits user to interact with the nodes and edges (e.g., to apply a query) but such a feature is not required.

The platform can be a cloud service that permits the user to interact with the platform through graphical user interfaces to complete the different stages of the application development process. That would generally be understood to involve a combination of one or more computers, software implemented on the one or more computers that configures the computers to provide a specialized application, and online, Internet website access, to the functionality through a (conventional) browser or in some cases, a software application (e.g., a mobile app). The platform or system can be structured to define features as individual elements having certain characteristics such as meta data. A feature is further defined herein.

In preferred embodiments, the platform is an online software development platform that is used by the public to engage a company to develop a particular software application for the customer. An example of such a system is illustratively described in U.S. Patent Publication No. 20180107459, by Dugal et al., filed Oct. 17, 2017, which is incorporated herein by reference in its entirety. The platform is preferably configured to provide the user, a potential customer, with the ability to interact with different interactive user interfaces (display screens, which can refer to a portion of a displayed screen or graphical user interface) to intuitively specify the requirements for the desired custom software application. The platform can be configured to operate as an application in object code that interacts with the user. The platform preferably includes a repository of existing source code for individual features that have been previously collected, used and/or tested to implement a corresponding feature. This source code can be reused, modified or compiled during the software development to produce the actual software application sought by the user. Thus, the system is configured to maintain different modes of a feature and one that is the source code for the actual feature for use in developed application, and one that names the feature and defines associated meta data (and/or links (e.g., connect using pointers to other features).

The platform can also include a subsystem that communicates with a set of third party software developers to communicate the requirements (via messaging) and to engage the developers to develop additional source code or desired modification that after a query to the existing database of feature source code is determined to be needed or unavailable in the repository, thus requiring the developers to create new code for requirements or selections that are not in the repository (which is communicated via the platform).

The platform can also communicate the requirements internally via electrical communications and in response automatically generate or assemble source code that contains the source code for the selected features from the repository. The repository can store different version of the source code such as for different operating system or different end use platforms (e.g., mobile phones versus laptops). As part of the software development process, the platform can display interfaces that require the user to select the operating system and end user platform. If desired, the platform takes that selection into account in generating or assembling source code for a customer's actual application.

The platform can be configured to allow the user to select the desired features as a preliminary step in order to specify the requirements for the desired custom software application (the scope of the software project).

The platform can therefore be configured for the user to perform the design process or a portion thereof, e.g., on its own without the need to involve designers or third party user interface design applications, and to have a general initial (mutual) understanding of expectation and scope through this process. The platform can preferably provide the user with an integrated resource for design with a streamlined process for software development where there is preexisting common structure between design and development such as by way of correspondence between features and corresponding source code, for the actual software, that is part of the platform.

FIG. 1 is a simplified block diagram of a distributed computer network 100 incorporating an embodiment of the present invention. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, an intranet, a private network, a public network, a switched network, Internet telephony, IP telephony, digital voice, voice over broadband (VoBB), broadband telephony, Voice over IP (VoIP), public switched telephone network (PSTN), and combinations of these, and the like.

System 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system. An instance of a server system 120 and a computing device 105 may be part of the same or a different hardware system. An instance of a server system 120 may be operated by a provider different from an organization operating an embodiment of a system for specifying an object in a design, or may be operated by the same organization operating an embodiment of a system for specifying an object in a design.

Client systems 105, 110, and 115 typically request information from a server system which provides the information. Server systems by definition typically have more computing and storage capacity than client systems. However, a particular computer system may act as both a client and a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include portable electronic devices (e.g., mobile communication devices) such as the Apple iPhone®, the Apple, or any device running the Apple iOS™, Android™ OS, Google Chrome OS, Symbian OS®, or Windows Mobile® OS. In a specific embodiment, a "web browser" application executing on a client system enables users to select, access, retrieve, or query information and/or applications stored by server system 120. Examples of web browsers include the Android browser provided by Google, the Safari® browser provided by Apple, the Opera Web browser provided by Opera Software, and Internet Explorer Mobile browsers provided by Microsoft Corporation, the Firefox® and Firefox for Mobile browsers provided by Mozilla®, and others.

Figure 2:
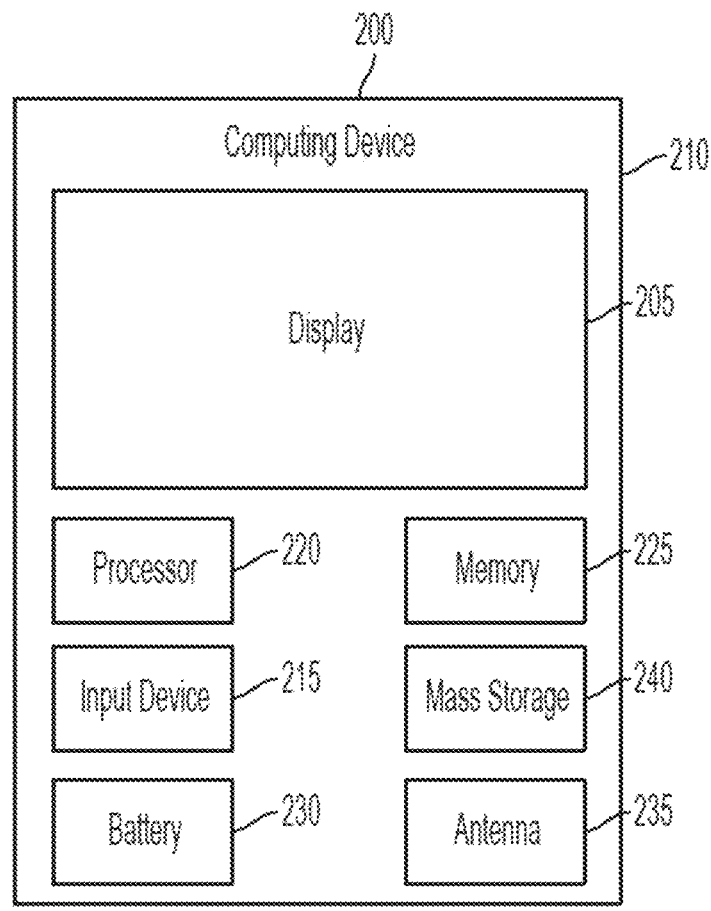
FIG. 2 shows an exemplary computer system such as a client system according to an embodiment of the present invention.

FIG. 2 shows an exemplary computer system such as a client system of embodiments of the present invention. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like. Computer system 200 may include a bus or other communication mechanism for communicating information between components. Mass storage devices 240 may store a user application and system software components. Memory 225 may store information and instructions to be executed by processor 220.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, gestural interface (contact or non-contact gestures), biometric input sensors, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 100 may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One®, provided by HTC Corporation, the iPhone® or iPad®, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice embodiments of the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing embodiments of the invention may be transmitted via wires, radio waves, or through a network such as the Internet. In another specific embodiment, a computer program product including a variety of software program code to implement features of embodiments of the invention is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the invention using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
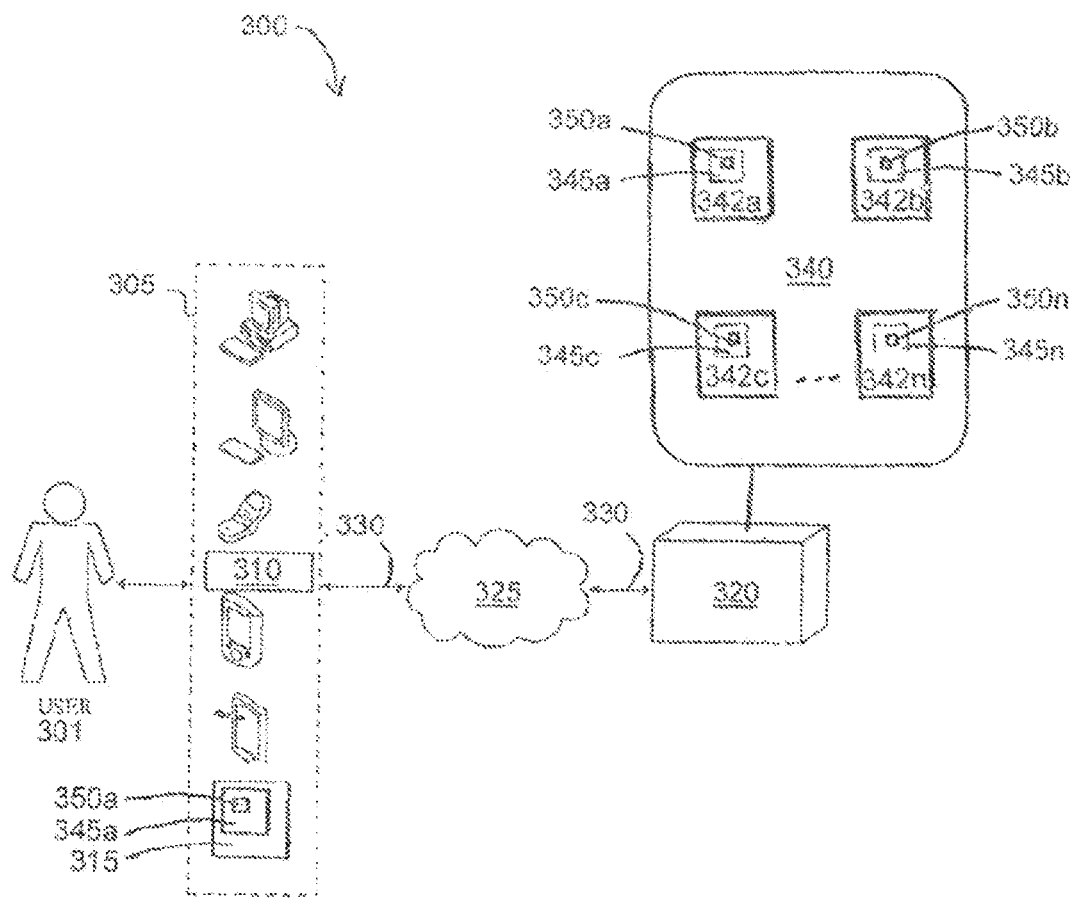
FIG. 3A is a simplified block diagram of an embodiment of a system for creating software.
FIG. 3B illustrates a functional block diagram of an online software development platform according to an embodiment of the present invention.

FIG. 3A is a simplified block diagram of an embodiment of a system 300 for creating software for use by a user 301. System 300 includes one or more user computing devices 305, and a server 320, coupled to a communication network 325 via a plurality of communication links 330. Computing device 305 may be used to run a user application 310 for creating software from existing code and new code. User application 310 may use computing device 305 and network 325 to access server 320. Communication network 325 (or "network 325") provides a mechanism for allowing the various components of system 300 to communicate and exchange information with each other via communication links 330. Server 320 may include or have access to a database 340 of code libraries 342a, 342b, . . . 342n. Each code library includes software code (not shown) from which system 300 may select to create customized software. Each code library 342a, 342b, . . . , 342n may have selected from it a subset of code sections 345a, 345b, . . . , 345n, which server 320 may assemble into customized software 350a, 350b, . . . , 350n and provide to user 301 via computing device 305. Customized software may be complete or may need to be augmented with additional custom code sections that may be newly created by partner developers. Server 320 or an administrator may combine or integrate newly created code with existing code sections to create customized software.

Computing device 305 may run a software-creating component 315 which may be provided with a subset of code sections (e.g., subset 345a from server 320 via user application 310) that software-creating component 315 (like server 320) may assemble into customized software (e.g., customized software 350a).

Network 325 may be any suitable communications network. Communication network 325 may itself be comprised of many interconnected computer systems and communication links. As an example and not by way of limitation, one or more portions of network 325 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another suitable network, or a combination of two or more of these. Network 325 may include one or more networks 325.

Connections 330 may connect computing device 305 and server 320 to communication network 325 or to each other. Communication links 330 may be hardwire links, optical links, satellite or other wireless communications links, wave propagation links, or any other mechanisms for communication of information. This disclosure contemplates any suitable connections 325. In particular embodiments, one or more connections 325 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 330 each include an ad hoc network, an intranet, an extranet, a VPN, a LAN, a WLAN, a WAN, a WWAN, a MAN, a portion of the Internet, a portion of the PSTN, a cellular telephone network, another suitable connection 330, or a combination of two or more such connections 330. Connections 330 need not necessarily be the same throughout system 300. One or more first connections 330 may differ in one or more respects from one or more second connections 330.

Server 320 may be a network-addressable computing system that can host one or more product databases 340. Server 320 may be responsible for receiving information requests from computing device 305 via user application 310, for performing the processing required to satisfy the requests, for generating responses (e.g., custom software 350a, . . . 350n) to received inquiries, and for forwarding the results corresponding to the requests back to requesting computing device 305. Server 320 may store, receive, or transmit data and software, and information associated with the data and software (including user data). The processing required to satisfy the requests may be performed by server 320 or may alternatively be delegated to other servers connected to communication network 325. For example, other servers may host database 340, or have additional databases. Server 320 may be an intermediary in communications between a computing device 305 and another server system, or a computing device 305 may communicate directly with another server system. Server 320 may be accessed by the other components of system 300, for example, directly or via network 325. In particular embodiments, one or more users 301 may use one or more computer devices 305 to access, send data to, and receive data from server 320.

Computing device 305, connections 330, and network 325, enable user 301 to access and query information stored and applications run by server 320, such as database 340. Some example computer devices 305 include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

In an embodiment, user application 310 may be run or executed by a different system. For example, computing device 305, or server 320, or both, may run user application 310. That is, user application 310 may be run by computing device 305, or the application may be run on server 320 and accessed by computing device 305 through a browser and network 325. For example, computing device 305 could be operated as a terminal, with user application 310 being run on a server, e.g., server 320. In an embodiment, aspects or functionalities of user application 310 are run by server 320, or another computing system or server. In an embodiment, the steps of the methods described herein may be performed, at least in part, in cloud-computing environment.

FIG. 3A illustrates a particular arrangement of user 301, computing device 305, and server 320, but this is an example arrangement. Any other suitable arrangement of user 301, computing device 305, server 320, and network 325 may be used. For example, computing device 305 may be connected directly to server 320. Also, computing device 305 and server 320 may appear to be distinct yet operate on the same hardware. In addition, any number of users 301, clients 305, and server 320 may be used in embodiments.

Figure 4:
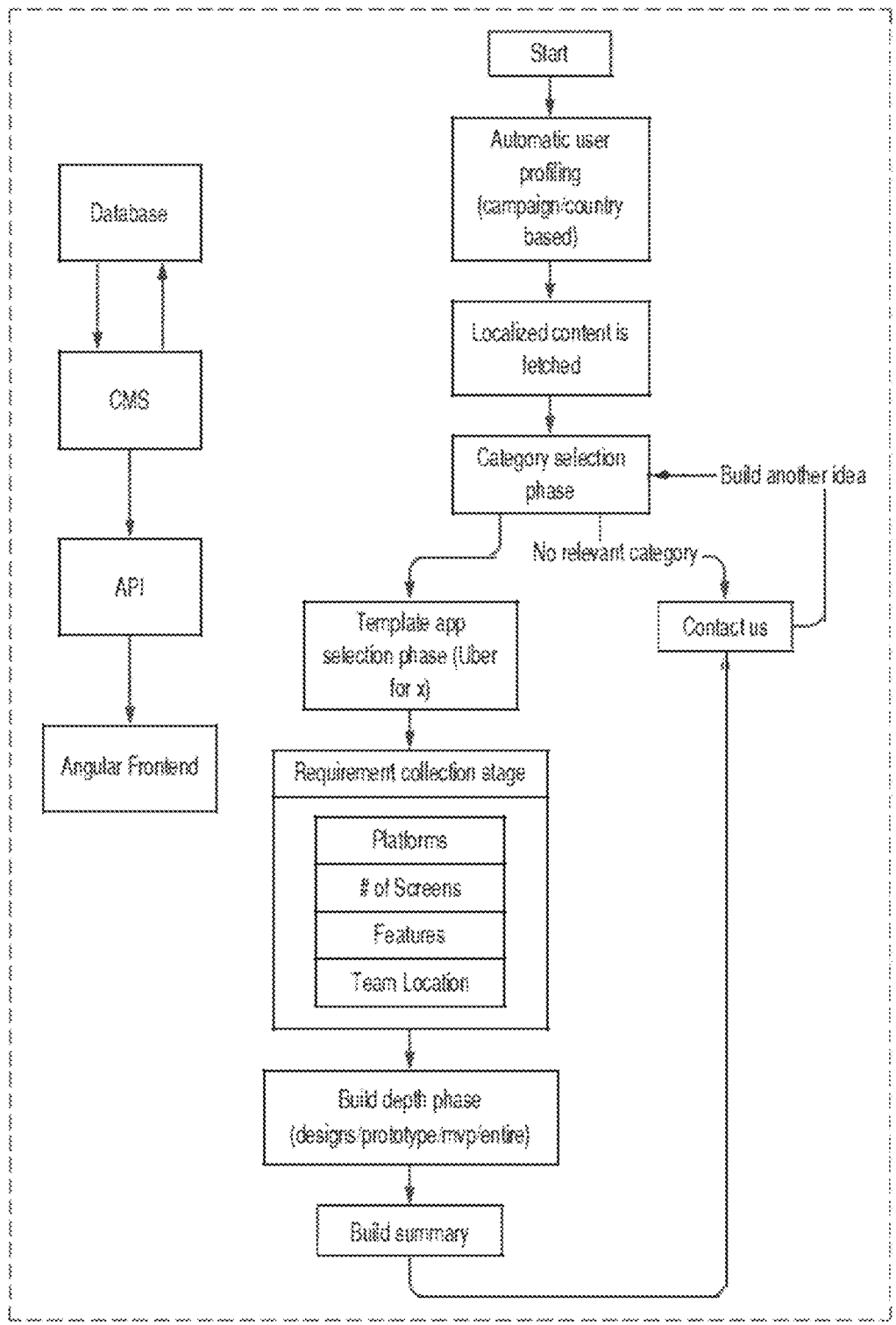
FIG. 4 is a diagram showing a block diagram of aspects of system architecture of an embodiment for creating software, i.e., decision triggers and user flow, and a block diagram illustrating back end components of an embodiment for creating software.
Figure 5:
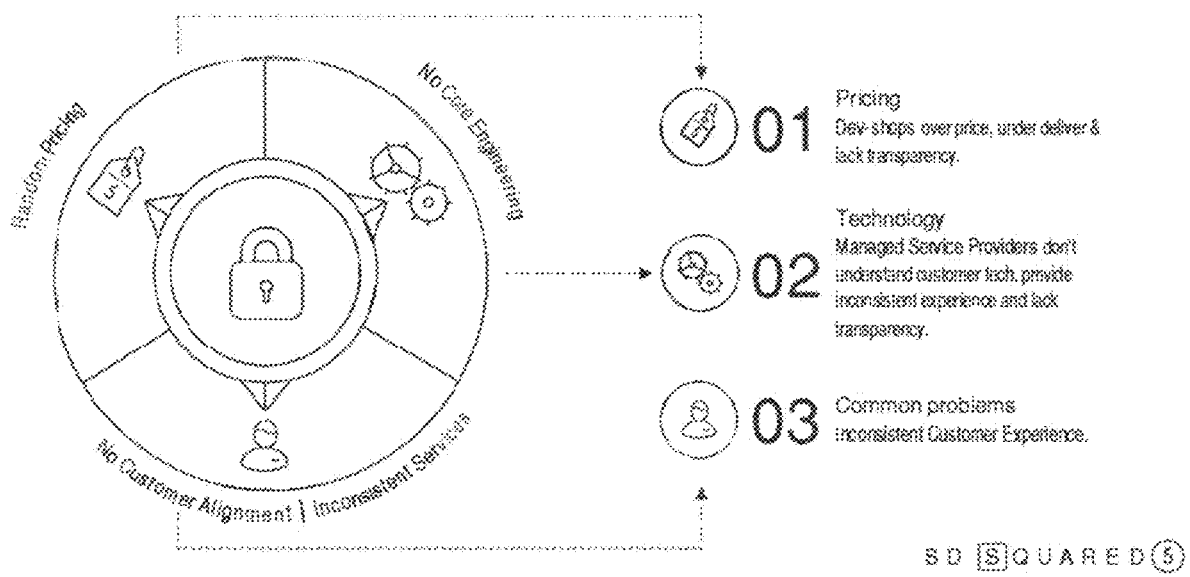
Figure 6:
Figure 8:
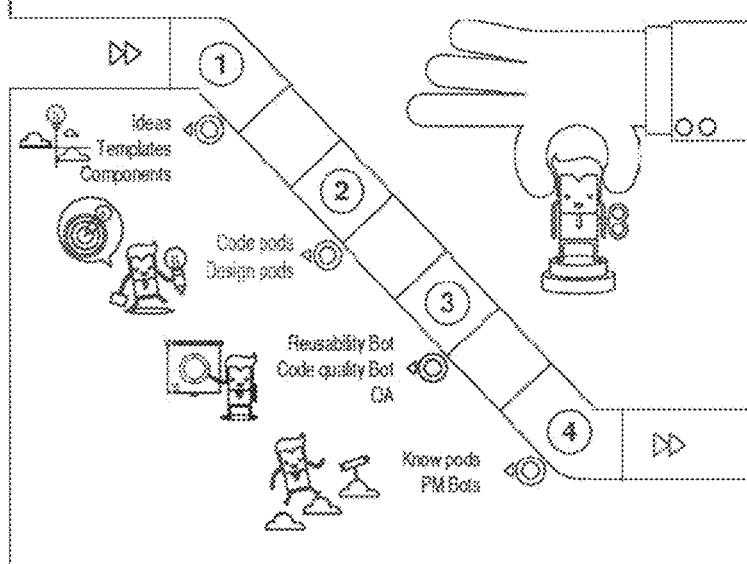
Figure 9:
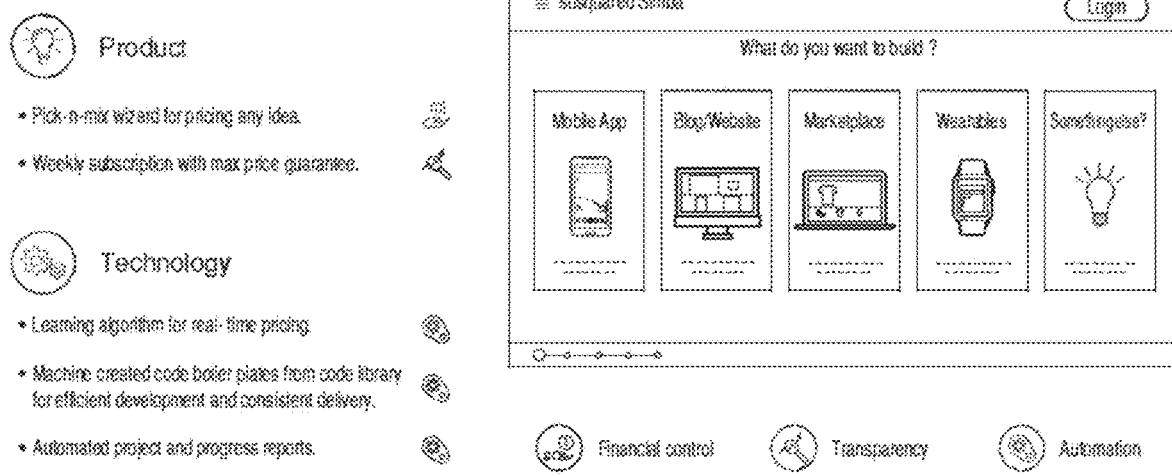
Figure 10:
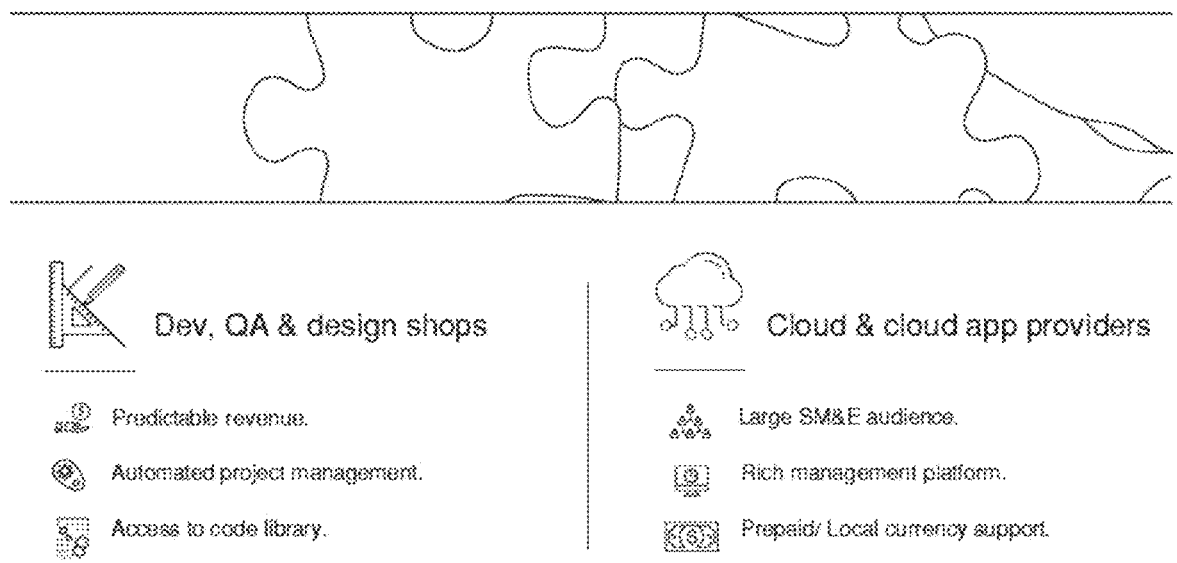
Figure 11:
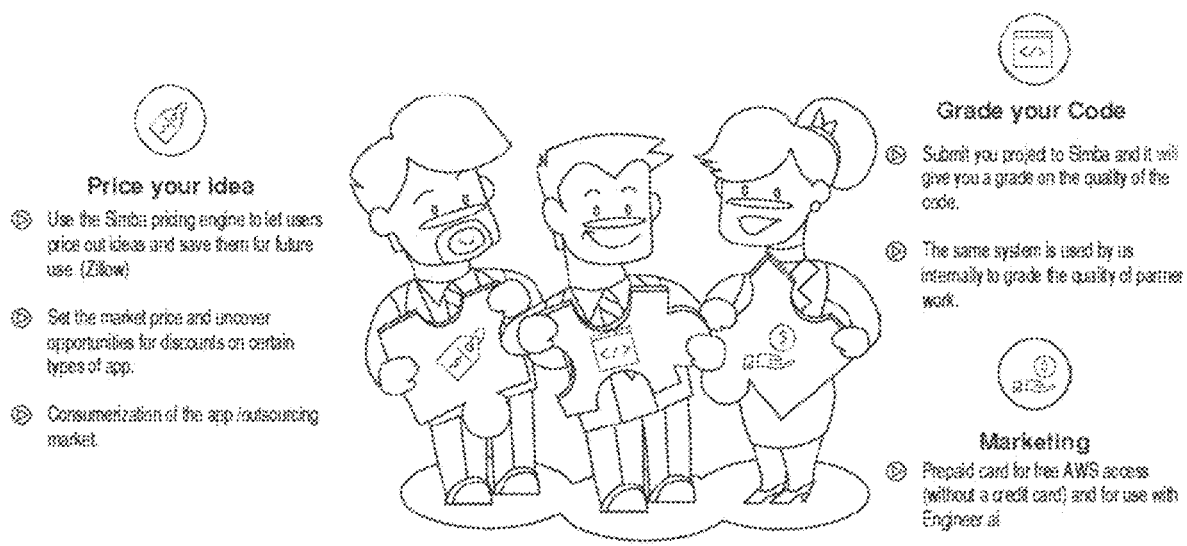
FIGS. 11-12 describe and illustrate aspects of how the user acquires access to embodiments and aspects of the value provided by embodiments of the systems and methods.
Figure 12:
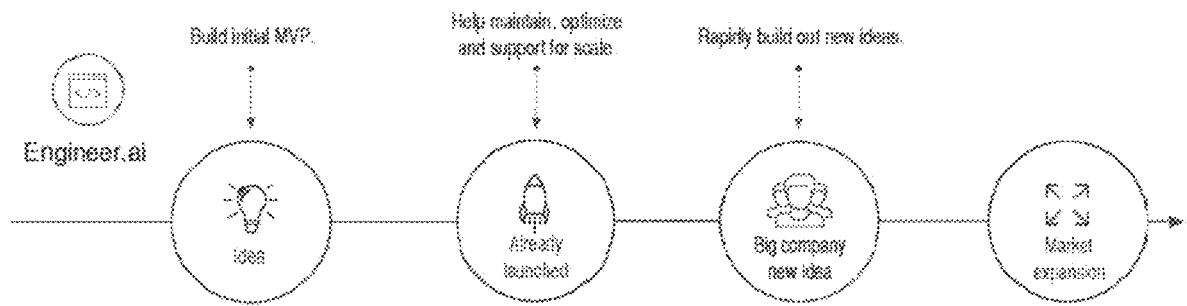
Figure 13:
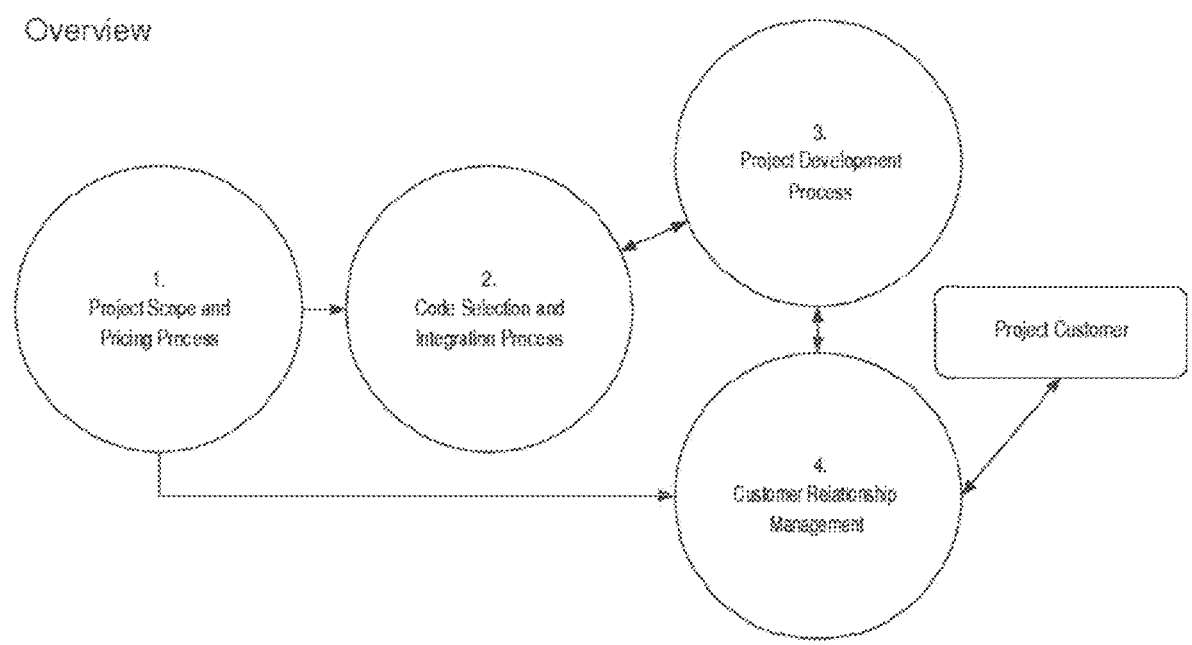
FIG. 13 is a block diagram illustrating an overview of an embodiment for creating software.
Figure 14:
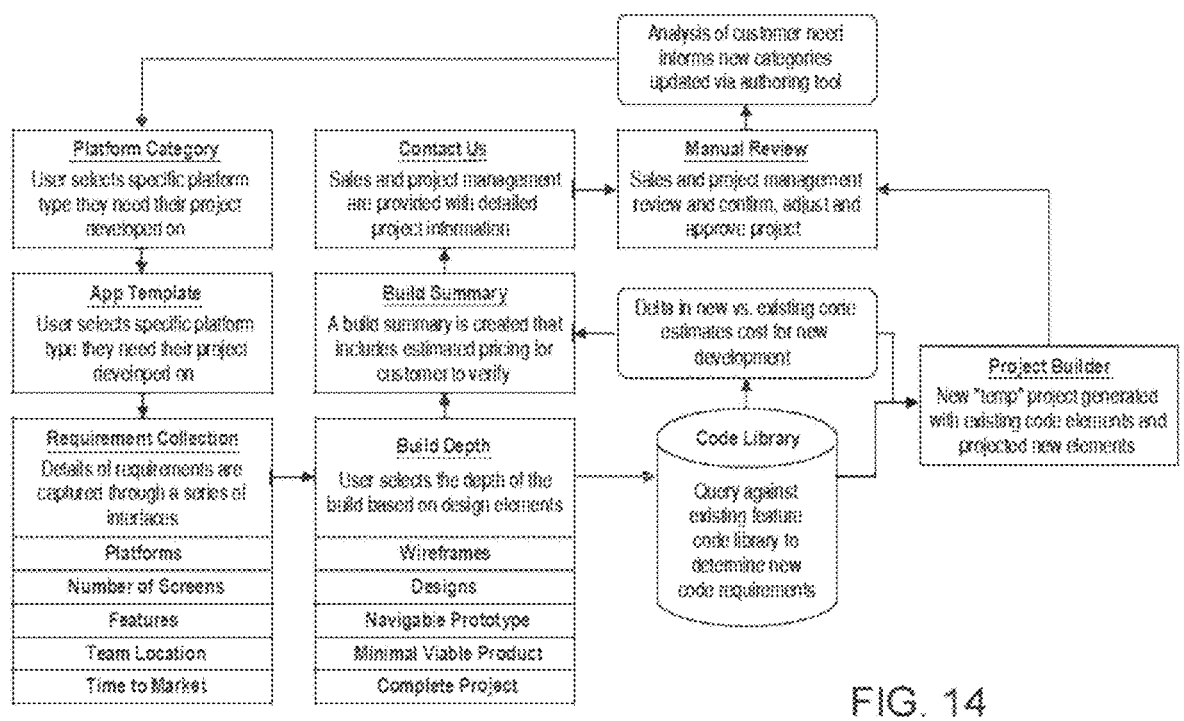
FIG. 14 is a block diagram illustrating a project scope and pricing process of an embodiment for creating software.
Figure 15:
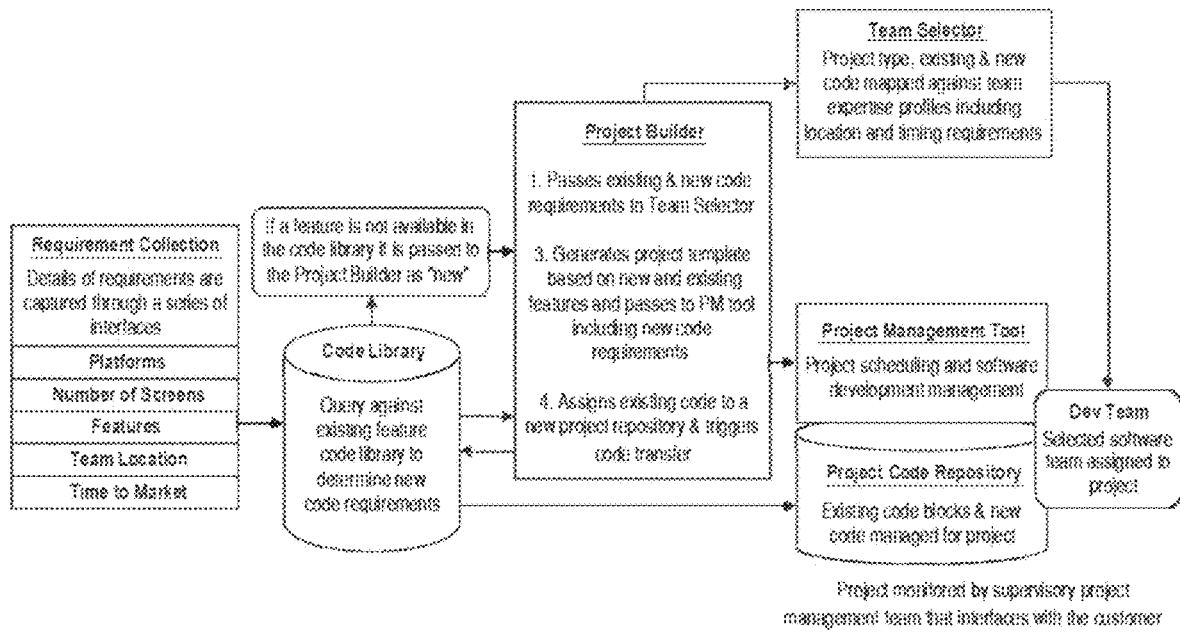
FIG. 15 is a block diagram illustrating a code selection and integration process of an embodiment for creating software.
Figure 16:
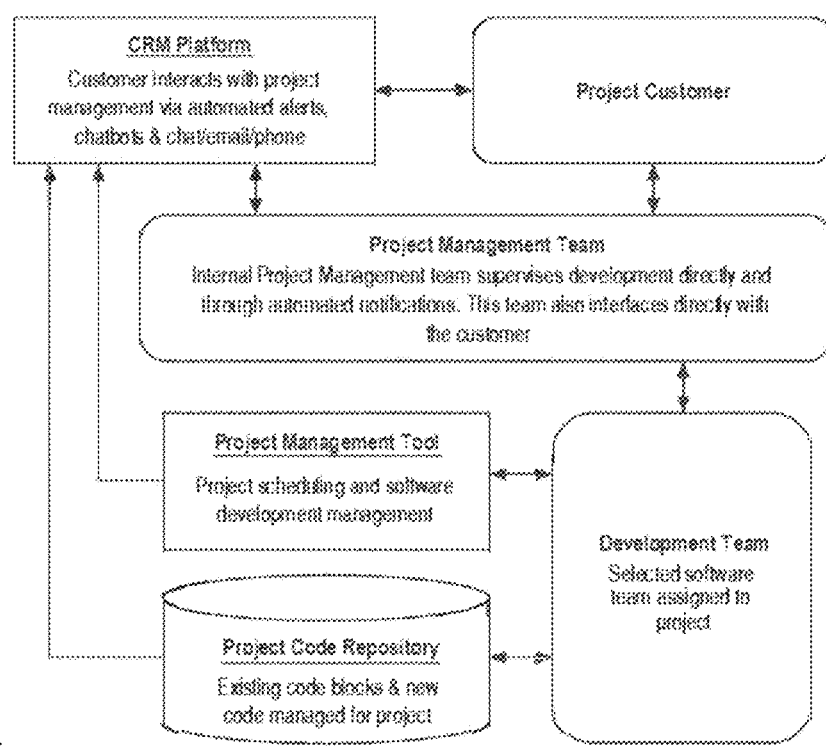
FIG. 16 is a block diagram illustrating a project development process of an embodiment for creating software.
Figure 17:
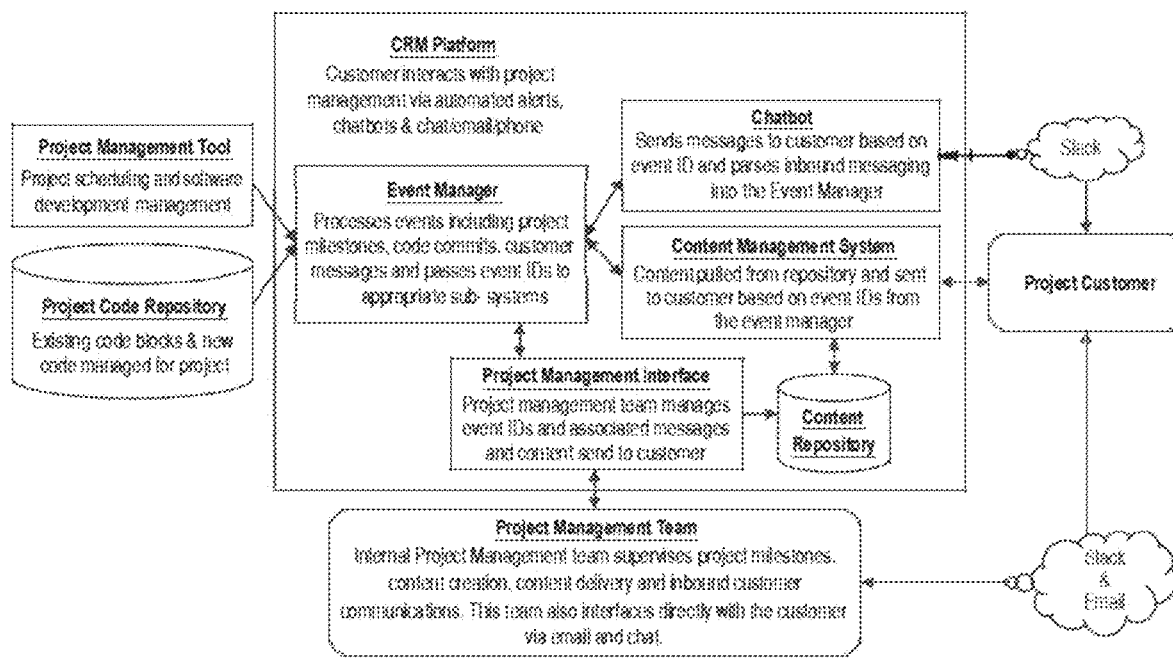
FIG. 17 is a block diagram illustrating a customer relationship and management process of an embodiment for creating software.

FIG. 4 is a diagram showing block diagrams of system architecture of an embodiment for creating software.

In an embodiment, a method for creating software is called "Engineer.ai."

Why was Engineer.ai created? Engineer.ai was created to allow for the building of digital products at least 30% faster and for 30% less than anyone else in the industry, all while guaranteeing top quality.

What is it and how does it work? Engineer.ai is an "as-a-service" platform for software outsourcing, turning App Development/Software Outsourcing into something as simple as a restaurant menu that you can pick a-la carte. This includes an On-Demand & Online Price Calculator for building any digital product from a Wearable to a Marketplace to an App with price guarantees, and intelligent automation/machine assistance that reduces the average cost and time of any project by at least 30%-40%. Engineer.ai offers a transparent fixed price upfront. No surprises and any amount over your fixed price is waived.

How does the service/product work? Engineer.ai provides an intuitive and easy-to-use wizard for pricing any idea in less than 60 seconds with pre-set options made available based on the project type. The fixed price you get is offered immediately and upfront. You don't need to wait or speak to a salesperson to know exactly what your project will cost and how long it will take to deliver.

How is my project managed? Engineer.ai provides weekly updates so you always know the exact status of your project. Engineer.ai practices gold standard for coding so quality is never sacrificed. Engineer.ai offers a weekly subscription and billing model so you are never locked in and can pause, speed up, or walk away at anytime.

Engineer.ai Benefits
1) Build your idea for 30% less and 30% faster than your competitors.
2) Use our easy-to-use wizard for pricing any idea in less than 60 seconds.
3) Get transparent and fixed pricing for your project upfront and instantaneously without speaking to a sales rep.
4) Have the confidence your project will be delivered on time and will not go over budget.
5) If you are not sure what you want, use our wizard to build out your idea by choosing from a bundle of pre-set options.

Engineer.ai Description

Engineer.ai uses machines to automate and institutionalize as much of the software outsourcing process as possible. Engineer.ai includes transparent pricing, standardized delivery, and a manufacturing-styled approach to development that reuses an estimated 50% of code and design that is often standardized and duplicated across many apps and digital platforms.

A key part of our business model is how Engineer.ai actually scales and builds. Engineer.ai scales by using 3rd party dev shops/contractors and having them deliver under the Engineer.ai brand, and Engineer.ai uses code libraries. Similarly Engineer.ai lets Software Companies get predictable revenue, a framework that lets them get paid and a way for them to access our rich code libraries & SIMBA Platform (Simple, Integrated, Machine-Based, Architecture Platform). Engineer.ai also scales by the institutionalization of the Engineer.ai code and development process.

SIMBA connects the entire product delivery process together. It integrates on-boarding, pricing, engineering and product/project management using machine-learning processing and A.I. ("artificial intelligence") to keep constant conversation with the customer. Aspects of SIMBA include:

A "Pick-n-mix" wizard for pricing any idea.
A weekly subscription with max price guarantee.
A learning algorithm for real-time pricing.
A machine-created templates from code library for efficient & consistent delivery.
And an automated project and progress reports to ensure that customers have transparency in pricing, financial control, and automation Engineer.ai is the first service to unify Development Shops around the world:
First published pricing platform that lets your price an app or an idea within 30 seconds online.
First process-driven and machine-led manufacturing approach for building software in a "just-in-time" model.
First use of machine-learning and Artificial Intelligence in machines and BOTs (software applications that run automated tasks (scripts) over the Internet) to automate the product delivery process.
For areas Engineer.ai feels need more "business interest," Engineer.ai may subsidize the development, such as efforts with content-led marketplaces; Engineer.ai can effectively invest in customers by simply offsetting some of its fees.

Role of SIMBA in Engineering.ai:
  Automated Pricing
  Machine-assisted product management
  Code creation Engineer.ai—Features
  1) Project selector
    a) Category selection
      i) Current categories
      ii) Option for more categories
      iii) Metrics to track selection and % completion
    b) Template type
    c) Other project description (outside selector parameters)
    d) Platforms
    e) Feature preview
    f) Portfolio examples
    g) Team location
    h) Dev speed (time to market)
    i) Build fidelity 2) Pricing estimate
   a) Real time projected cost based on project guidelines created in the selector
3) Customer contact capture & confirmation
   a) Project review (can user adjust here?)
   b) Customer contact collected
   c) Saved confirmation of submission via email Engineer.ai—Additional Features
1) Project estimator additional features
   a) Wireframe database
   b) Intelligence re: additional categories & dataset
   c) Mobile & touch friendly
   d) Workflow for customer/sales interaction
   e) In an embodiment, the method makes a decision based on historical variance. For example, if there is some customization required for a particular type of app, and if the type of app shows a historical cost variation, the method adjusts the potential customization cost based on the historical variation.
2) Payment & contract execution
   a) Proposal automation
      i) Proposal based on integration (the degree and depth of integration)
   b) Billed deposit and weekly, monthly invoice
   c) Pay from invoice
3) Design
   a) Goal to assign to the right designer
   b) Preview based on component elements & wireframes
   c) Map to design library
   d) 2-3 week iteration with customer (details?)
4) Project team assignment
   a) Semi-automated
   b) Track team member status & availability projection
5) Component user story generation
   a) Board creation
   b) Database of tagged stories
   c) Feature based story selection
6) Base code generation
   a) Code pods
   b) Feature based pod selection
7) Sprint estimator
   a) Feature/team/speed based estimation of completion
   b) Automated notifications of progress, potential deadline extensions, and sprint completions Engineer.ai—Partner Development Qualification Process
1) Sources
   a) Inbound
      i) Website
   b) Outbound
   c) Referral
2) Pre-qualification
   a) Minimum team requirements
   b) Ideal candidate profile—measure fill rate success/skills, experience, etc
   c) Team profiling tool
      i) Team members
      ii) Skills (dev lang, years experience, code committed)
      iii) Projects (associated projects)
3) Project review
   a) Minimum project examples—Live products ideal
   b) Customer testimonials
4) Code review
   a) Standardized code submission
   b) Submission, automated and manual review, and workflow process TABLE 1 gives a description of pages from a website employing embodiments of a method for creating software from library and custom components. In TABLE 1, a particular webpage is identified by the columns: ID, Title, and Labels. A Description column includes a description of the particular webpage and its function.

Figure 18:
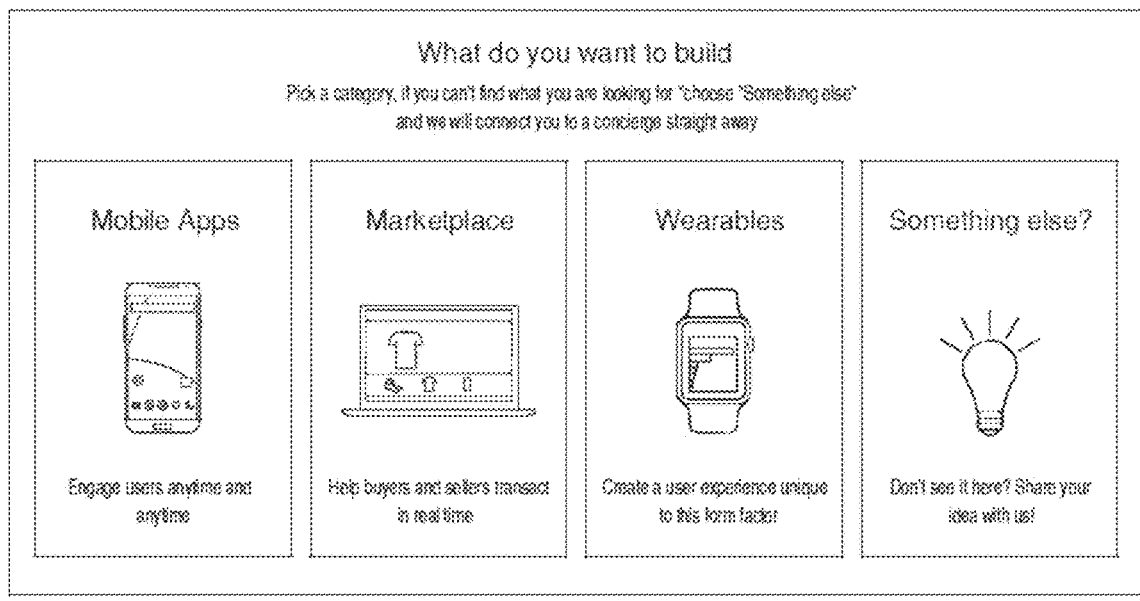
Figure 19:
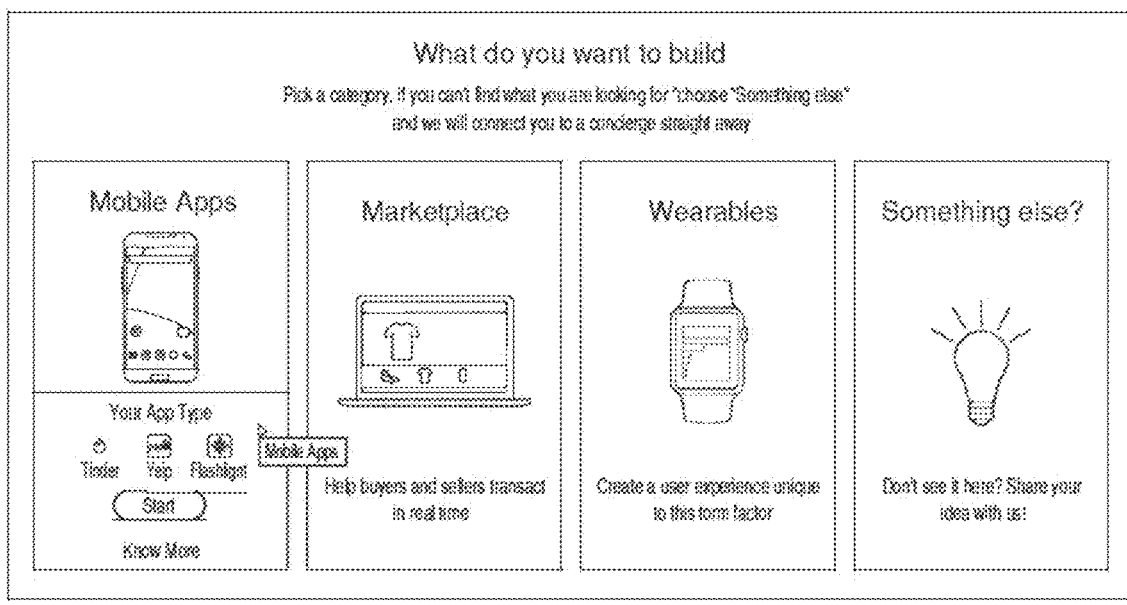

| ID | TITLE | LABELS | DESCRIPTION |
|---|---|---|---|
| 129382929 | Product Homepage/ Landing Page | homepage | As a user when I navigate to Engineer.ai's URL, I will be navigated to landing page of Engineer.ai. The Landing page will present 5 Main Card options to choose from. 1. Mobile App 2. Blog/Website 3. MarketPlace 4. Wearables 5. Others Note: The entire text on cards like title, description etc. along with icons is not hardcoded and is available through backend. Please ignore text on all cards in the design references. See, e.g., the screenshot on FIG. 18 for design reference. |
| 129383567 | Homepage | Card Hover State | homepage | As a user, when I hover on the cards on the landing page, then the Main card will move up and an overlay card will reveal options related to the main card. I should also see two buttons - Start and Know More. Note: The entire text on cards like title, description etc. along with icons is not hardcoded and is available through backend. Please ignore text on all cards in the design references. See, e.g., the screenshot on FIG. 19 for design reference. |
| 129446881 | Homepage | Card Hover State | Know More | homepage | As a user, when I click on *Know more* button after hovering on a card, there should be another overlay over the same card revealing the full feature set that are applicable for card being hovered upon. The feature set list can be longer than the display area and thus needs to be horizontally scrollable. |

-continued

Figure 20:
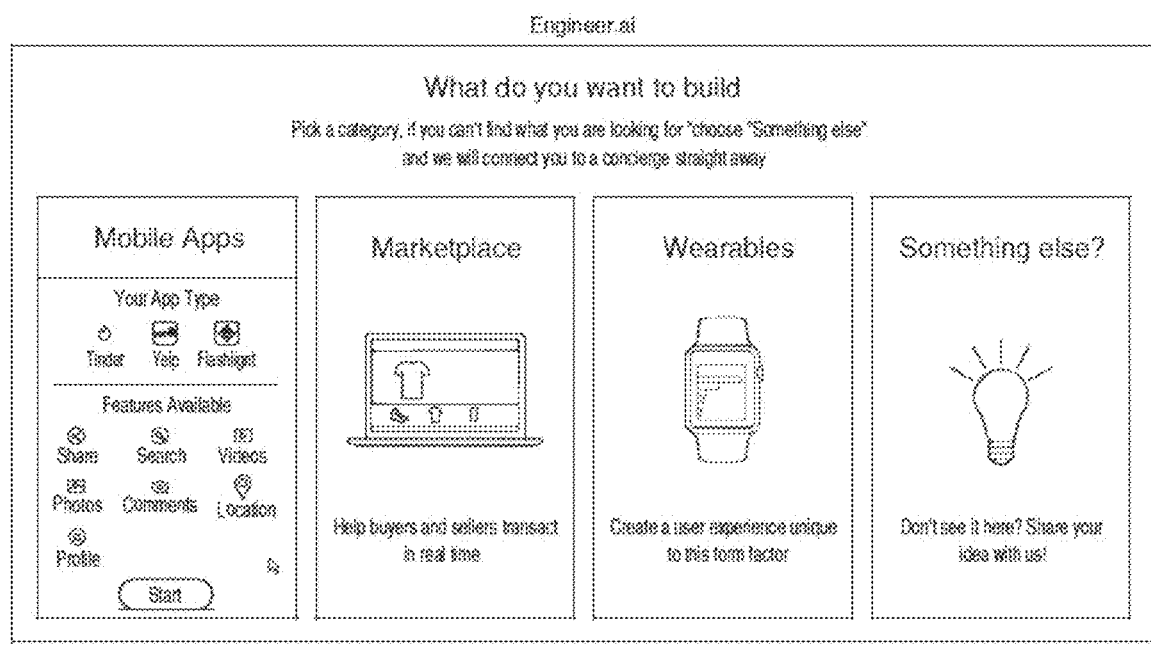
Figure 21:
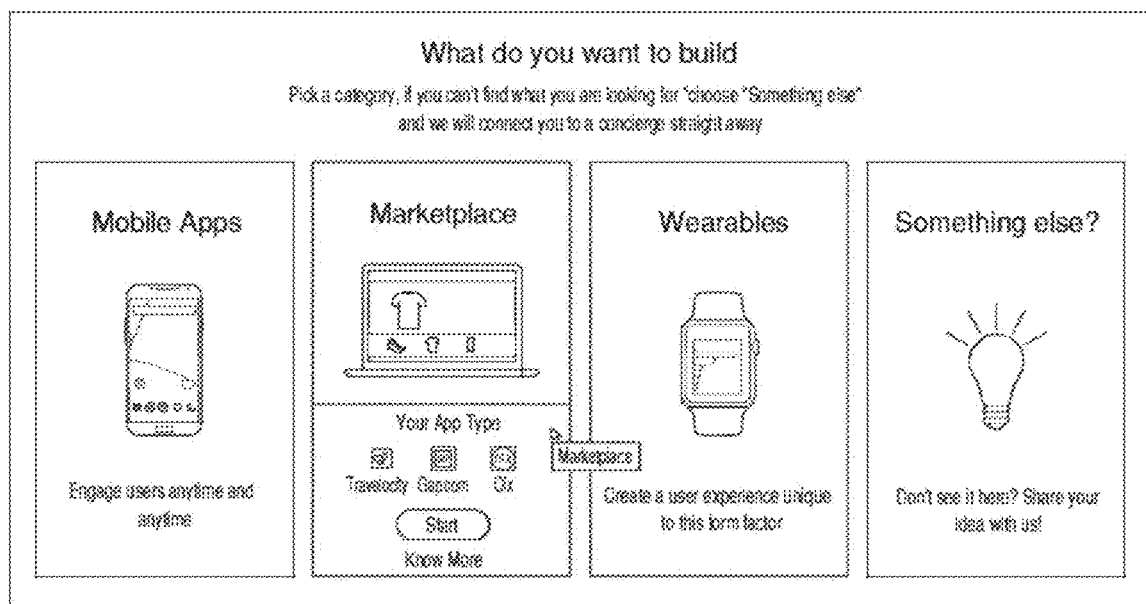
Figure 22:
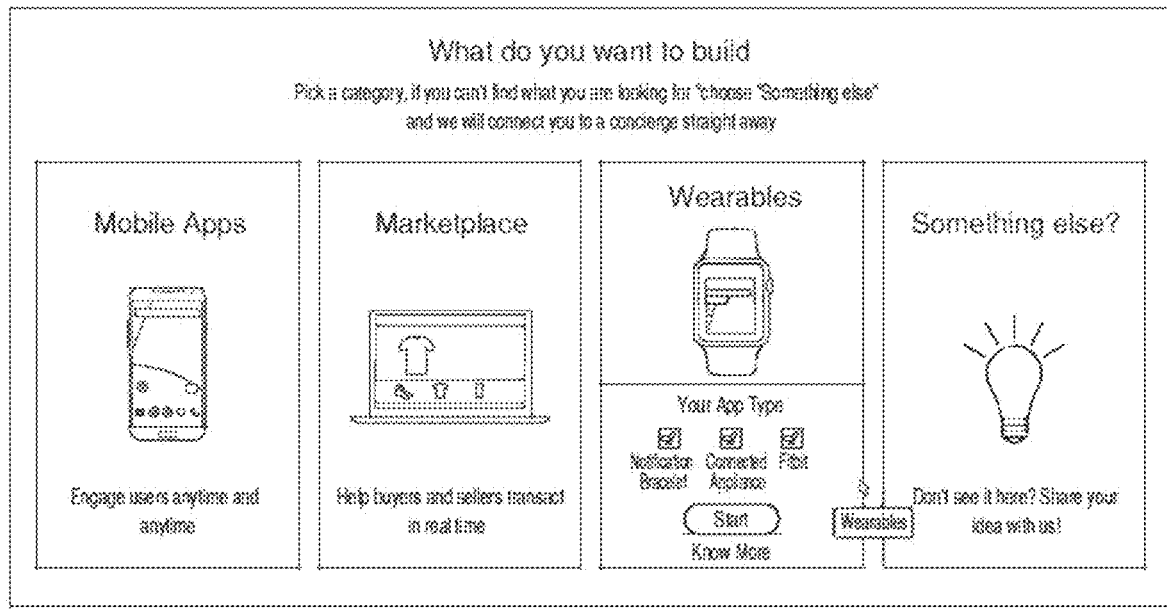
Figure 23:
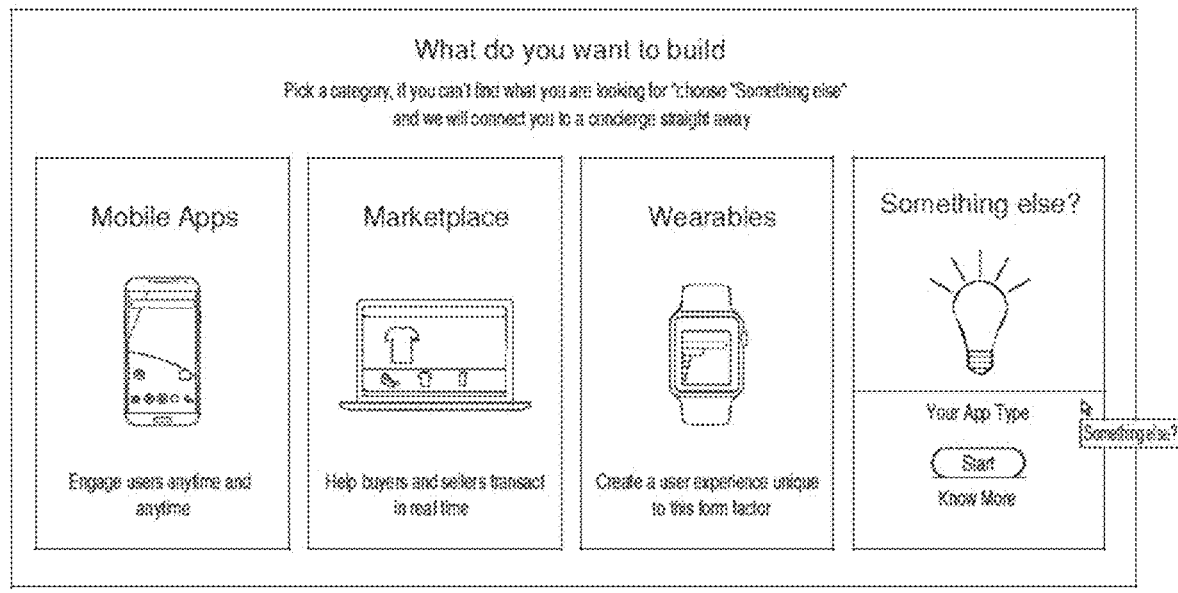
Figure 24:
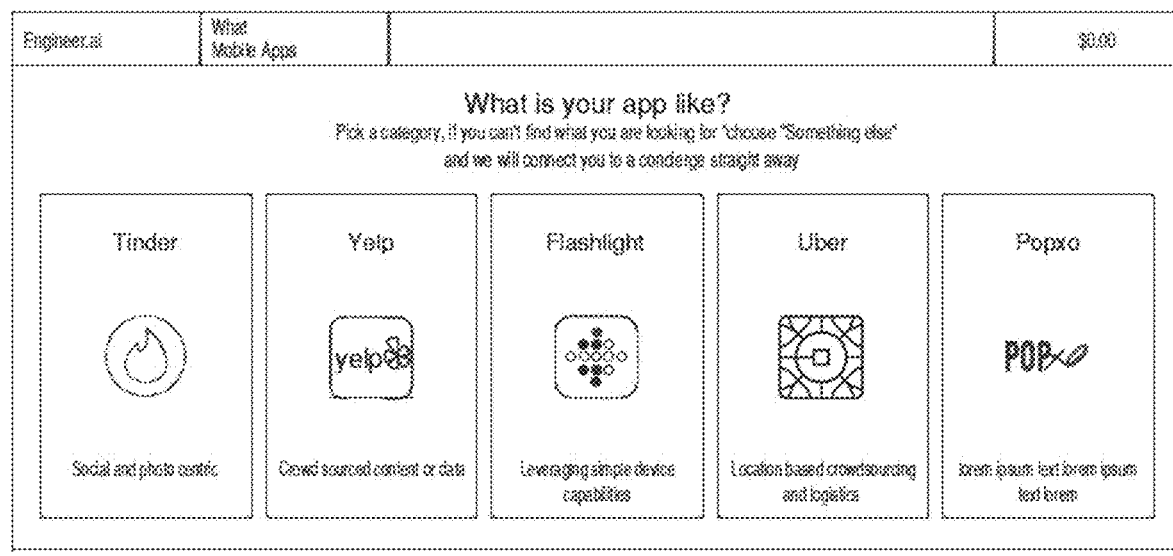
Figure 25:
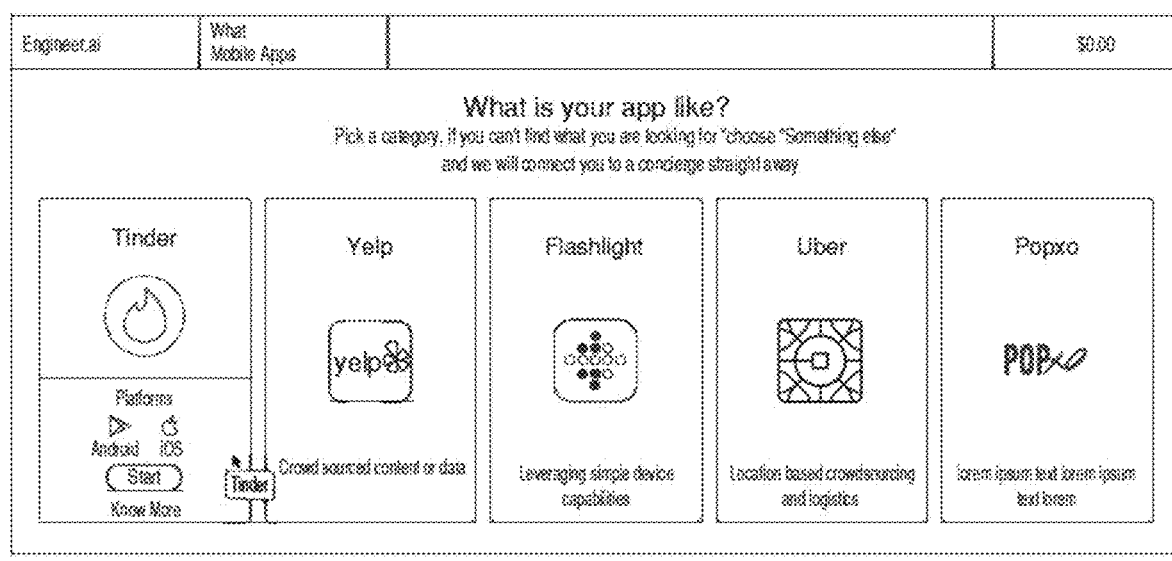
Figure 28:

| ID | TITLE | LABELS | DESCRIPTION |
|---|---|---|---|
| | | | A start button will also appear below the feature list. I can click on *Start* button and should be able to follow story #129446683<br>There will be another button under start by the name of *Portfolio Projects*. Clicking on it will work as described in story #129447399<br>Note: The entire text on cards like title, description etc. along with icons is not hardcoded and is available through backend. Please ignore text on all cards in the design references.<br>See, e.g., the screenshot on FIG. 20 for design reference. |
| 129440667 | Personalize Product \| Select Platform | personalize product | As a user, when I am navigated to this screen through the workflow defined in story #129521135, I should see the first section to select the platforms I need to support in my Product. This is the first step towards personalization of my product.<br>Below the applicable platforms list, I should be able to see the number of screens anticipated in my product.<br>A Next button appears below, clicking on which I should be able to follow story #129514959. This button gets enabled only when I have one or more options from all required fields selected in this section.<br>Note: The entire text on cards like title, description etc. along with icons is not hardcoded and is available through backend. Please ignore text on all cards in the design references.<br>See, e.g., the screenshot on FIG. 27 for design reference. |
| 129515019 | Personalize Product \| Select Delivery Speed | personalize product | As a user, when I am navigated to this screen through the workflow defined in story #129514959 (on click on next), the third section overlay should come to top. This will allow me to select the team I want to use to develop my product and is the third step towards personalization of my product.<br>A back button will appear below to the header clicking on which I will be navigated to Select Features story (#129514959)<br>A Next button appears below, clicking on which I should be able to follow story #129515169. This button gets enabled only when I have one or more options from all required fields selected in this section.<br>Note: The entire text on cards like title, description etc. along with icons is not hardcoded and is available through backend. Please ignore text on all cards in the design references.<br>See, e.g., the screenshot on FIG. 28 for design reference. |
| 129515169 | Personalize Product \| Select Delivery Speed | personalize product | As a user, when I am navigated to this screen through the workflow defined in story #129515019 (on click on next), the third section overlay should come to top. This will allow me to select the speed of delivery for my product and is the fourth step towards personalization of my product.<br>A back button will appear below to the header clicking on which I will be navigated to Select Features story (#129515019)<br>A Next button appears below, clicking on which I should be able to follow story #129522065. This button gets enabled only when I have one or more options from all required fields selected in this section.<br>Note: The entire text on cards like title, description etc. along with icons is not hardcoded and is available through backend. Please ignore text on all cards in the design references.<br>See, e.g., the screenshot on FIG. 30 for design reference. |
| 129514959 | Personalize Product \| Select Features | personalize product | As a user, when I am navigated to this screen through the workflow defined in story #129440667 (on click on next), the second section overlay should come to top. This will allow me to select the features I need to include in my Product and is the second step towards personalization of my product. |

-continued

Figure 26:
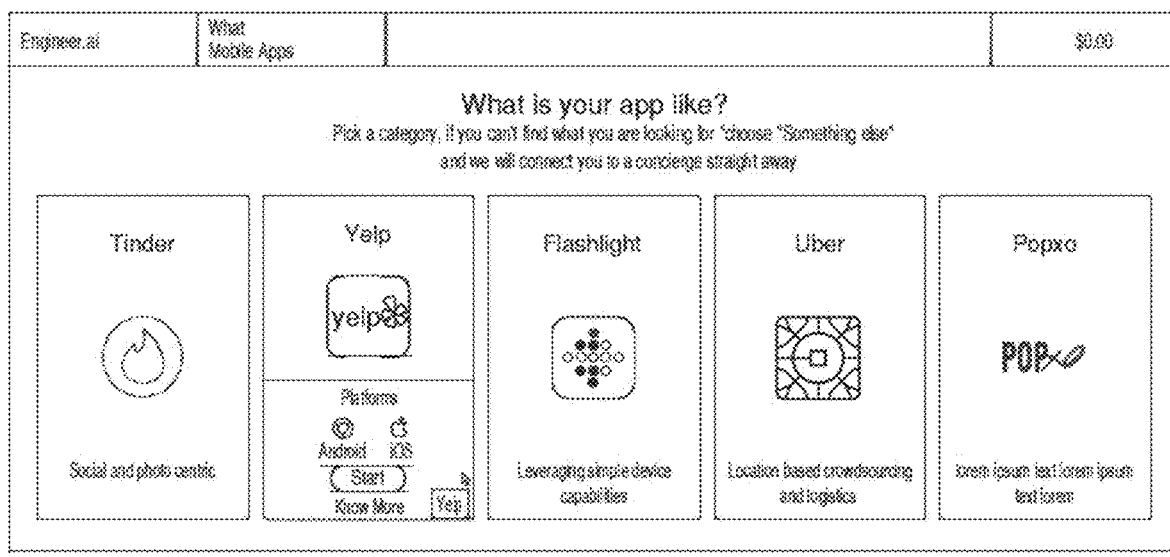
Figure 33:
Figure 35:
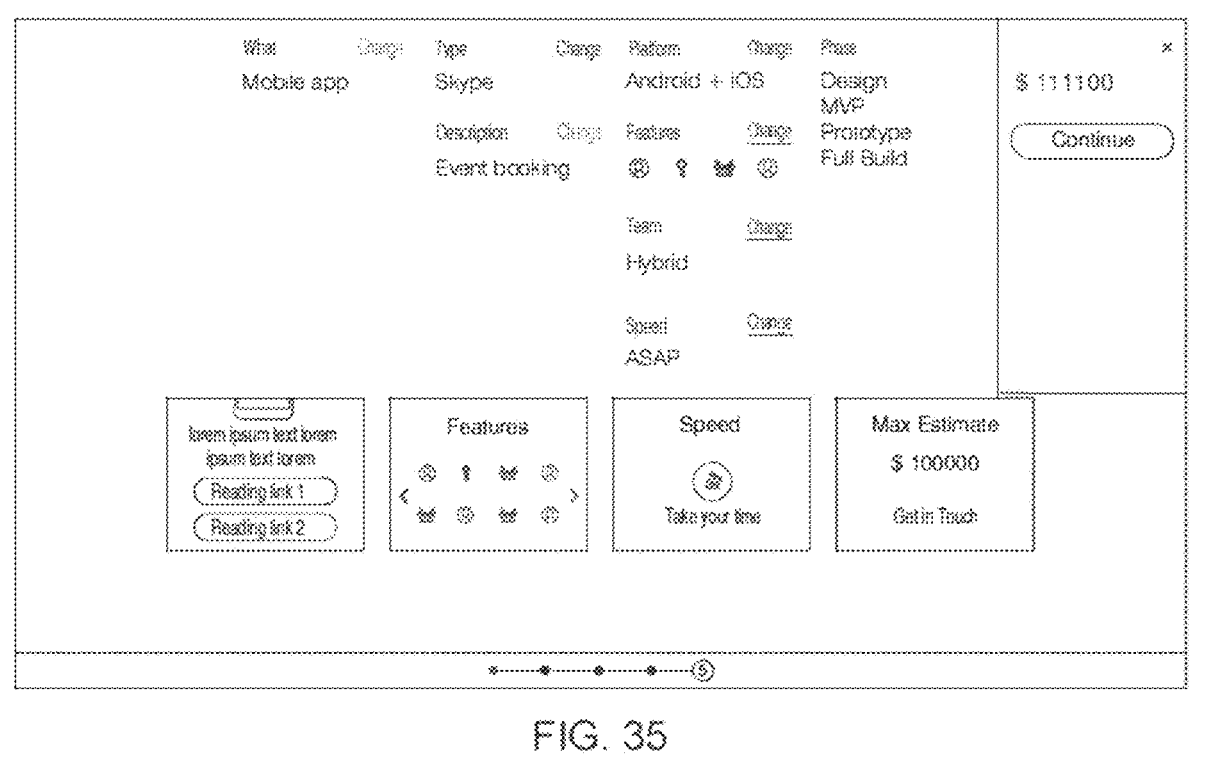
Figure 36:
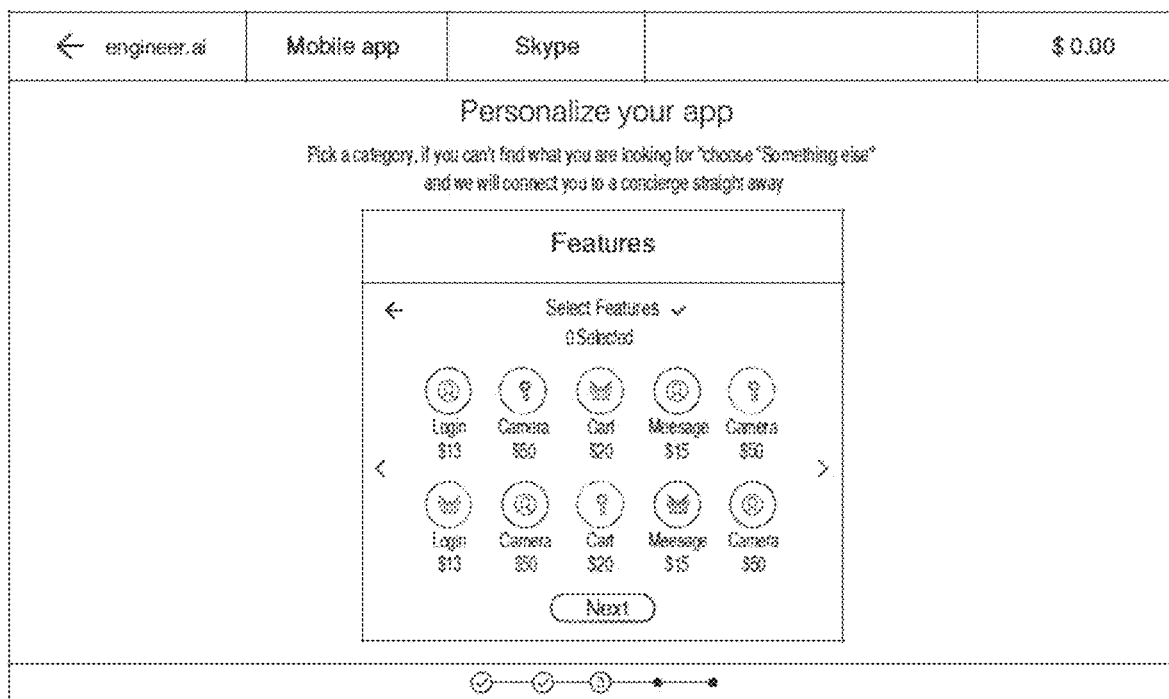

| ID | TITLE | LABELS | DESCRIPTION |
|---|---|---|---|
| | | | A Back Button will appear below to the header clicking on which I will be navigated to Select Platform & Pages story (#129440667)<br>A Next button appears below, clicking on which I should be able to follow story #129515019. This button gets enabled only when I have one or more options from all required fields selected in this section.<br>Note: The entire text on cards like title, description etc. along with icons is not hardcoded and is available through backend. Please ignore text on all cards in the design references.<br>See, e.g., the screenshot on FIG. 36 for design reference. |
| 129446683 | Product Type Landing Page (Start from any card on Homepage) | homepage, product type | As a user, when I click on *Start* button from hover state or additional card overlays, I should be navigated to a separate page which will show cards based on the card selected on homepage.<br>Additionally, if I click on header section of this card, the same workflow should be followed.<br>Note: The entire text on cards like title, description etc. along with icons is not hardcoded and is available through backend. Please ignore text on all cards in the design references.<br>See, e.g., the screenshot on FIG. 35 for design reference. |
| 129514073 | Product Type Page | Card Hover State | product type | As a user, when I hover on a card in Product Type page, the card should show the list of platforms that are applicable for that product type.<br>A *Know more* button will also appear below the applicable platforms list. I can click on this button and should be able to follow story #129514203<br>On clicking the header of this card, I should be able to follow story #129514387<br>Note: The entire text on cards like title, description etc. along with icons is not hardcoded and is available through backend. Please ignore text on all cards in the design references.<br>See, e.g., the screenshot on FIG. 26 for design reference. |
| 129522743 | Personalize Product | Your Build Card | personalize product | As a user, when I am navigated to this screen through the workflow defined in story #129522065 (on click on next), the build card should appear. This screen shows your selections through 4 cards as showcased in the design reference.<br>It should display the following 4 cards in the given order:<br>* Product Type with description<br>* Platform, Screens and Features list<br>* Team and Speed<br>* Development Phases and Estimate<br>A Get in Touch button appears inside the 4th card, clicking on which I should be able to follow story #129522917.<br>Note: The entire text on cards like title, description etc. along with icons is not hardcoded and is available through backend, unless stated otherwise. Please ignore text on all cards in the design references.<br>See, e.g., the screenshot on FIG. 33 for design reference. |
| 129522065 | Personalize Product | Select Project Phases | personalize product | As a user, when I am navigated to this screen through the workflow defined in story #129515169 (on click on next), the phase selection screen should appear. It is the final step towards personalization of my product and product development lifecycle.<br>It should display the following 4 phases:<br>* Design<br>* Prototype<br>* MVP<br>* Full Build<br>By default all the 4 phases will be selected. As a user, I should also be able to unselect the selected card(s) as many times and vice-versa.<br>The estimate in header should update instantly based on the selections I am making.<br>A Next button appears below, clicking on which |

-continued

Figure 34:

| ID | TITLE | LABELS | DESCRIPTION |
|---|---|---|---|
| | | | I should be able to follow story #129522743. This button gets enabled only when I have one or more options from all required fields selected in this section.<br>Note: The entire text on cards like title, description etc. along with icons is not hardcoded and is available through backend, unless stated otherwise. Please ignore text on all cards in the design references.<br>See, e.g., the screenshot on FIG. 32 for design reference. |
| 129514203 | Product Type Page \| Card Hover State \| Know More | product type | As a user, when I click on *Next* button on hovered card in Products page, I should be able to see the features I can request for. The card overlay that opened in previous view moves a bit up to accommodate the list.<br>If the list requires more space than available in the display area, the list should be horizontally paginated. A *Next* button will also appear below the applicable features list. I can click on this button and should be able to follow story<br>Note: The entire text on cards like title, description etc. along with icons is not hardcoded and is available through backend. Please ignore text on all cards in the design references.<br>See, e.g., the screenshot on FIG. 20 for design reference. |
| 129757983 | Add in pricing component | | Depending on what the user selects, the price should constantly be updating in the top-right section of the navbar |
| 129521135 | Create the Personalize Product Page | personalize product | As a user, when I am navigated to this screen through the workflow defined in story #129514387, I should see a card that has 4 dynamic sections stacked over one another. These sections (in defined order) are<br>* Select Platforms *(Hard Coded Label)*<br>* Select Features *(Hard Coded Label)*<br>* Select Team *(Hard Coded Label)*<br>* Select Speed *(Hard Coded Label)*<br>Initially, only the first section will be enabled and rest will be disabled. As and when I keep selecting options in each section, the next section in stack gets enabled. I can also navigate directly between all the enabled sections directly by clicking them. The selected sections comes on top while others are visible in the background.<br>For linear navigation between enabled sections, I should also be able to use the Back and Next button in each sections. The first section should not have a back button.<br>Note: The most of the text in sections like title, description etc. along with icons is not hardcoded and is available through backend; unless stated otherwise.<br>See, e.g., the screenshot on FIG. 27. |
| 129522917 | Personalize Product \| Get in Touch Screen | personalize product | As a user, when I am navigated to this screen through the workflow defined in story #129522743 (on click on "Get in Touch" button), the Get in Touch screen should appear. This screen should allow me to enter information in following fields:<br>* Project Name (100 Characters)<br>* Project Description (150 Characters)<br>* My email ID (75 Characters)<br>* My Name (50 Characters)<br>Below these fields, there should be a checkbox asking me to confirm that I agree to *Terms & Conditions* and *Privacy Policy*<br>I can also request for a *"Non Disclosure Agreement"* through another link below the above checkbox.<br>Lastly, I should be able to save the details and allow the team to connect with me. I should now be navigated to next screen which follows story #129523531.<br>See, e.g., the screenshot on FIG. 34 for design reference. |
| 129525811 | Show and update | | As a user I would like to see a dynamic header in the application. This header is visible when I click on |

-continued

Figure 37:
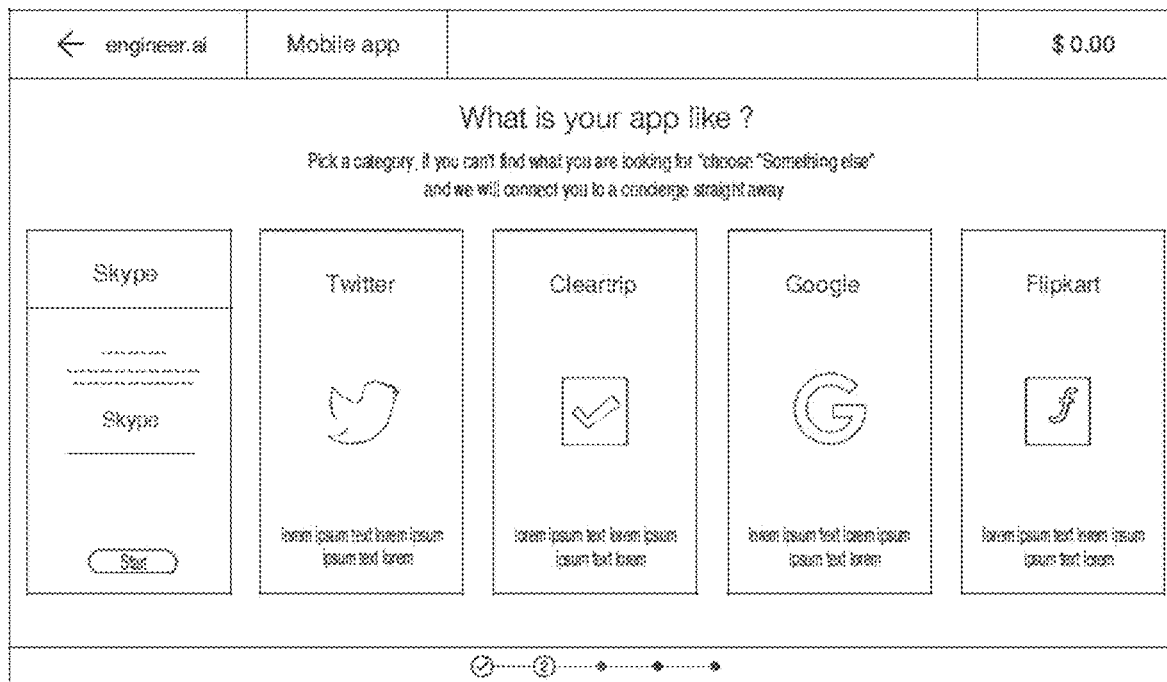
Figure 42:
Figure 43:

| ID | TITLE | LABELS | DESCRIPTION |
|---|---|---|---|
| | Header | | Start on any of the main cards on the home screen. The header has 5 sections (Collapsed form) The header has 5 sections (Expanded form) * Product Type * Product Sub Type & Its description * Platform, Features, Team and Speed * Phase * Estimate Each section/sub-section will be added to header as and when user navigates to these pages/sections and makes necessary selections on screen. Any update in these sections also instantly update the header with new information. I can also click on Header to see the expanded view. Please see the below design for reference for collapsed view See, e.g., the screenshot on FIG. 35 for design reference. |
| 129514387 | Product Type Page \| Add product description | product type | As a user, when I click on *Next* button on hovered card in Products page, an overlay will stack over existing overlays and allow me to add a description about the kind of product that I want to build. The description cannot be longer than 50 characters. Alternately, I can reach here by clicking the card header on *Product Types* page at any point of time. A *Start* button appear below the text field. I can click on this button and should be able to follow story #129440667 Note: The entire text on cards like title, description etc. along with icons is not hardcoded and is available through backend. Please ignore text on all cards in the design references. See, e.g., the screenshot on FIG. 37 for design reference. |
| 129523531 | Create the Concierge page | personalize product | As a user, when I am navigated to this screen through the workflow defined in story #129522917 (on click on "Get in Touch" button), the Concierge screen should appear. Here, I should be able to post my queries and add attachments. Attachment types TBD. Lastly, I should be able to start an estimation for a new build which redirects me to homepage. |
| 129447399 | Homepage \| Card Hover State \| Know More \| Portfolio | homepage, skip | As a user, when I click on *Portfolio Projects* button in know more section of a card on Home page, a new overlay will appear as showcased in the design reference. It should show a list of 4 customers and a few testimonials. The testimonials should be horizontally scrollable. A start button will also appear below the feature list. I can click on *Start* button and should be able to follow story #129446683 Note: The entire text on cards like title, description etc. along with icons is not hardcoded and is available through backend. Please ignore text on all cards in the design references. |

Figure 3B:
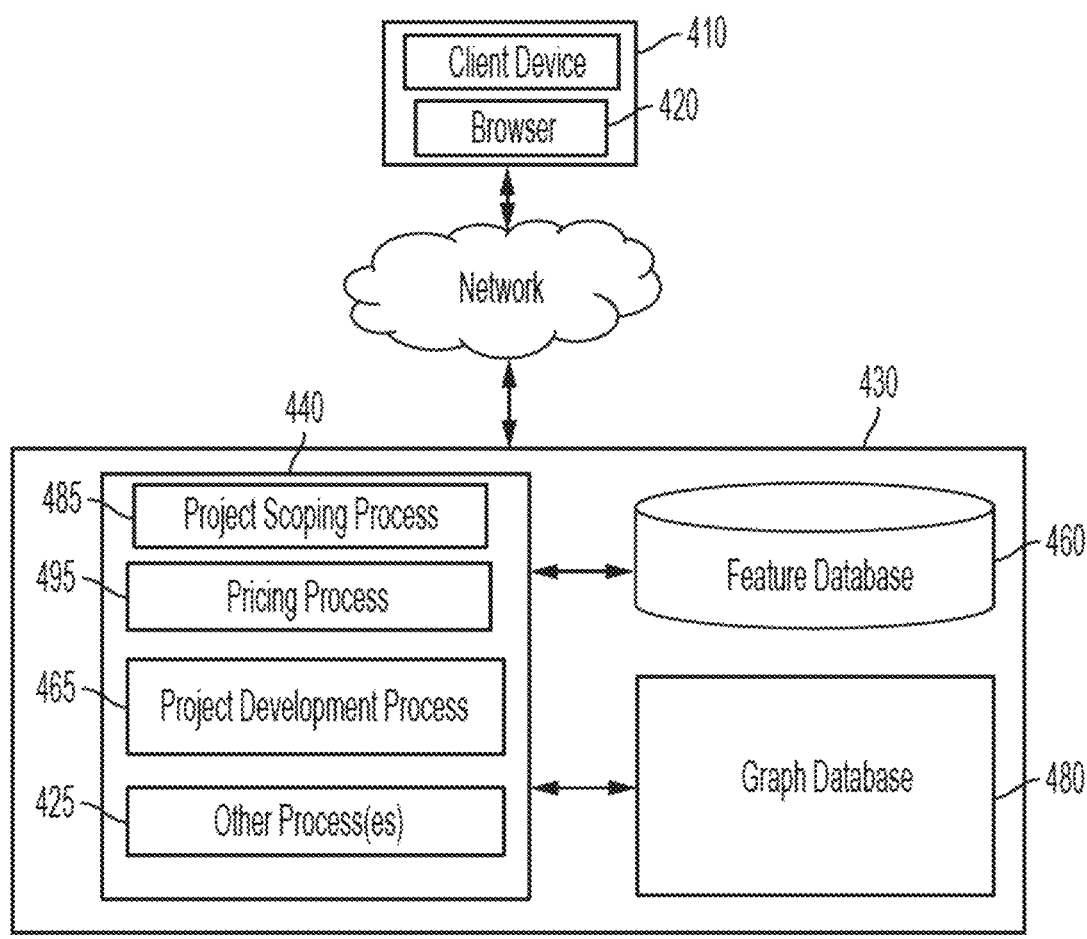

FIG. 3B illustrates a system for developing software according to an embodiment of the present invention. The system includes an application development software application 420 installed on an electronic device 410 and a builder software application 440 implemented on one or more servers 430. The electronic device 410 is preferably a desktop computer that can communicate with server via mobile networks or other wireless networks. Each of the electronic device and servers is a computer system that includes a microprocessor and volatile and non-volatile memory to configure the computer system. The computer system also includes a network connection interface that allows the computer system to communicate with another computer system over a network. Each software application may also be used independently or in conjunction with another software application to strengthen or supplement functionalities of the other software application.

The builder application 440 installed on the server 430 maintains a library of features for a software application. The library of features may be stored in a database 460. The builder application 440 is configured to transmit to the software development application on the client computer 410 the library of features, to receive a selection of a set of features, integrate the selected features into an integrated build card. The builder application further maintains a graph database 480.

The software development application 420 is configured to provide a graphical user interface that enables a customer to select and customize a set of features as part of a build card for building software application for a customer's project. In some embodiments, the software development application 420 is a web application provided by the builder application on the server and configured to run in a conventional browser. In a preferred embodiment, the software development application is the conventional browser 420 configured to access an application development website provided by the server.

Feature database 640 can also include source code for each of the plurality of available features. The saved source code provides a repository of source code for available features that the platform can use to generate object code for the actual application (e.g., based on the selected operating system) and/or to send the source code to select third party software developers to perform desired integration or modification based on customer specified requirements.

The builder application is organized into a plurality of processes that together provide an implement a comprehensive platform for customers to design or specify project requirements, financial management of the process including determination or estimation of pricing, project management, customer relationship management, and other processes. The builder application or platform can provide an integrated resource for design, development, purchase, and delivery of customer-desired software applications for software projects created by customers. The software development platform is configured to implement a plurality of electronic operational domains providing user-interactive capabilities or internal functionality of the software development platform. The domains each comprising a process.

A process is being used to refer at a high level to an aspect of the software platform (one or more separate or integrated electronic operations) directed to a particular aspect or objective of the platform. As such, the software development platform is configured to implement a plurality of electronic operational domains providing user-interactive capabilities or internal functionality of the software development platform. The domains interact and together provide the platform.

Systems and methods are described for creating software from library and custom components. In a method for creating software, a server running a software creating component may receive input from a customer, where the input describes at least one aspect of a software program. Based on the input, the software creating component may determine existing code components that may be used to create the software program, where the existing code components are stored in a code library accessible by the software creating component. Based on the user input and based on the existing code components that may be used to create the software program, the software creating component may determine new code components that must be developed for the software program. And, based on the existing code components that may be used and based on the new code components that must be developed, the software creating component may provide, to the user, a cost estimate for the software program.

Different embodiments may provide variations on the basic principles outlined herein. In an embodiment, the method may further comprise adjusting the cost estimate based on the at least one aspect of the software program. In an embodiment, the at least one aspect of the software program may include at least one of: a platform category, an application template, a requirement collection, a platform, a number of screens, a feature, a team location, a time to market, and a build depth. In an embodiment, the build depth may include: a wireframe, a design, a navigable prototype, a minimal viable product, or a complete project. In an embodiment, the method may further comprise: sending, by the software creating program, a set of existing code requirement and a set of new code requirements to a team selector; and generating, by the software creating program, a project template based on the existing code components that may be used and based on the new code components that must be developed. In an embodiment, the method may further comprise: generating, by the software creating program, a project schedule based at least in part on the project template, the project schedule including events related to the creation of the software program; and managing, by the software creating program, the events related to the creation of the software program. In an embodiment, the events related to the creation of the software program may include at least one of: a project milestone; a code commit; and a customer message. In an embodiment, the method may further comprise: passing, by the software creating program, at least one event ID to a communication program; and sending, by the communication program, a message to the customer based on the event ID. And in an embodiment, the method may further comprise: receiving, by a communication program, a message from the customer; and parsing, by the communication program, the received message into the software creating program.

As show in FIG. 3B, application 440 include project scoping process 485, pricing process 495, project development process 465, and other processes 425. The project scoping process 485 is configured to provide customers with the ability to specify the scope of the project. This can be done by way of user interfaces that permit the user to select templates, features, and/or design characteristics or requirements for the project. A project scope process can be configured to provide a user with the ability through interacting with display screens to specify and accept a scope for the software project.

Pricing process 495 is configured to provide customers with a determination of the price for the components of the software project and/or delivery of the software application meeting the specified selections by the user as part of the project scoping process. The pricing process 495 is configured to provide prices for the delivery of a software application for the software project. The project development process 465 is configured to provide management and tracking of the software project once initiated. It can involve selecting which software developers that are on the platform are assigned portions of the project. The assignment can be made in the platform by a CPE/CTE selecting developer in the system or can be made automatically. The project development process 465 can be configured to selectively assign one or more elements of the software project to developers and manage and track the development process of each software project in the platform. The discussion herein that encompasses the process functionality or is directed to achieving the process objective would be understood to be a part of that corresponding process. Other processes can be included in the platform such as instant prototyping.

Graph database 480 is included as part of the application. The graph database stores nodes and edges that represent corresponding entities and relationships between entities. Graph database 480 can be implemented on its own server and a copy of the graph database can be at discrete times provided the platform to provide services using the graph database.

The software development platform is configured to collect data from activity in the project scope process 485, pricing process 495, and project development process 465 in accordance with platform-defined graph data structures. The data is collected is tapped or copied from the existing operation of these domains or processes to collect historical data about activity in the platform and interactions to aggregate such data. The graph data structures comprising a plurality of different types of nodes representing entities and the node types comprising template, feature, and other node types such as developer or problem and each node type having a set of defined attributes, and different types of edges that represent interrelationship between entities.

The platform is configured to generate and store a graph database 480 comprising the nodes and edges created from the collected data in the operation of software development platform and is configured to reuse existing nodes and edges, add new nodes and edges, and adjust individual attributes assigned to each edge based on new data. For example, a new software project may include a login feature and the login feature was previously included in the scope of other previous projects, the platform does not need to add that node to the graph database since it was previously used. The edges are defined relationships between different type of nodes. Attributes can include a count or frequency associated with each edge stored in the graph database and represent how many times that the same edge connection (between the same two nodes) were found in the software projects that have been loaded into the graph database. The graph database manages large scale data in a different way than generally used databases.

The platform is configured to continue to load software projects (e.g., sets of features and/or templates into the graph database) and it can if desired include nodes or edges for related activities. The software development platform and related information is updated as new software projects are created or initiated in the platform. The software development platform is configured to issue a query to the graph database and in response, receive query results from the graph database or from related components that it uses to control one or more parts of the operation of the platform (e.g., an action within a process).

The software development platform is configured to implement one or more algorithms configured to traverse nodes and edges in the graph database in accordance with one or more criteria of an algorithm. The algorithm can be selected to correspond to the query, which in this case is directed to providing feature recommendations. The algorithm can traverse the knowledge graph to identify different paths starting from a node through its connected edges to other directly connected nodes and similarly continue until a criteria of the algorithm is not met (which causes that traversal to stop). So, for example, a path may involve node1-edge1-node2-edge2-node3. The algorithm identifies paths relevant to the query and stops traversing the nodes or edges when the criteria is not met. The algorithm can start with a different node in the graph to apply the algorithm and collect information such as paths can repeat the procedure over the graph database to discover the graph structure, nodes, edges, and/or paths that meet the criteria. The application of the algorithm can be implemented in advance to collect the resultant path or other information and the results can be stored for handling later received queries. The software development platform can be configured, in response to the query, to control a user interaction in the project scoping process comprising displaying an option that suggests a feature to include based on the structure of the graph database.

Figure 44:
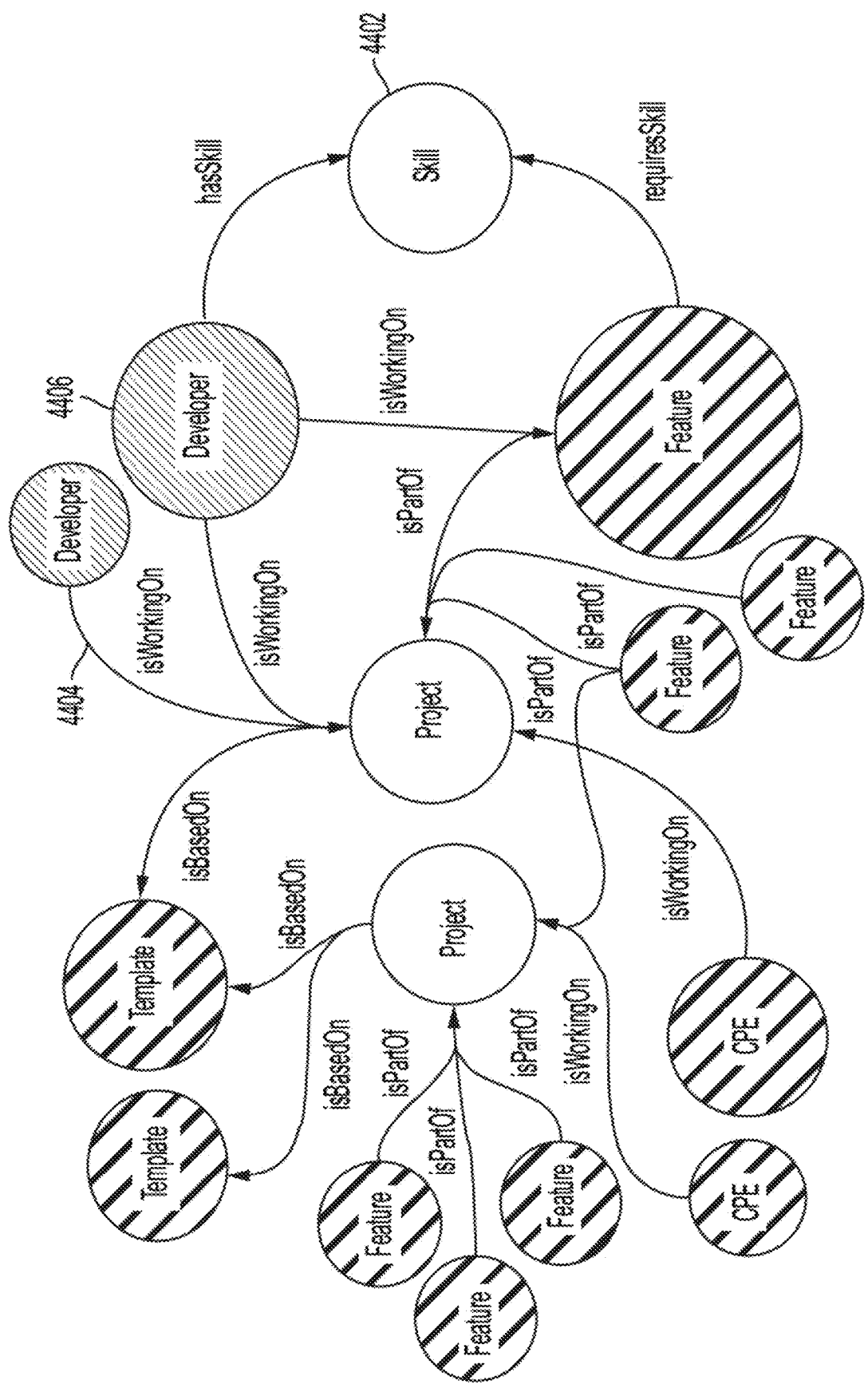
FIG. 44 illustrates a visual representation of a graph database according to an embodiment of the present invention.

Embodiments of the present invention implement a framework that takes advantage of the semantic relationships between diverse data points in software development platform's database. This is achieved by storing related data in a graphical structure. This allows the platform to enhance knowledge around each data-point by leveraging their connection with other data-points. FIG. 44 is an illustrative representation of an example of graph database containing different types of nodes (the circles) and edges (the lines connecting circles). Six types of nodes are illustrated in FIG. 44 including skill 4402, feature, project, CPE, template, and developer. Each node is for a different such entity so for example the two developer node be for developers John Smith and Jane Blue. The edges are shown to be directional and they demonstrate for example developer 4406 has a certain skill 4402. The platform can be configured to apply different traversal algorithms to quickly identify information (or set of relevant paths) and potential associations by traversing the nodes and edges of certain types.

Figure 45:
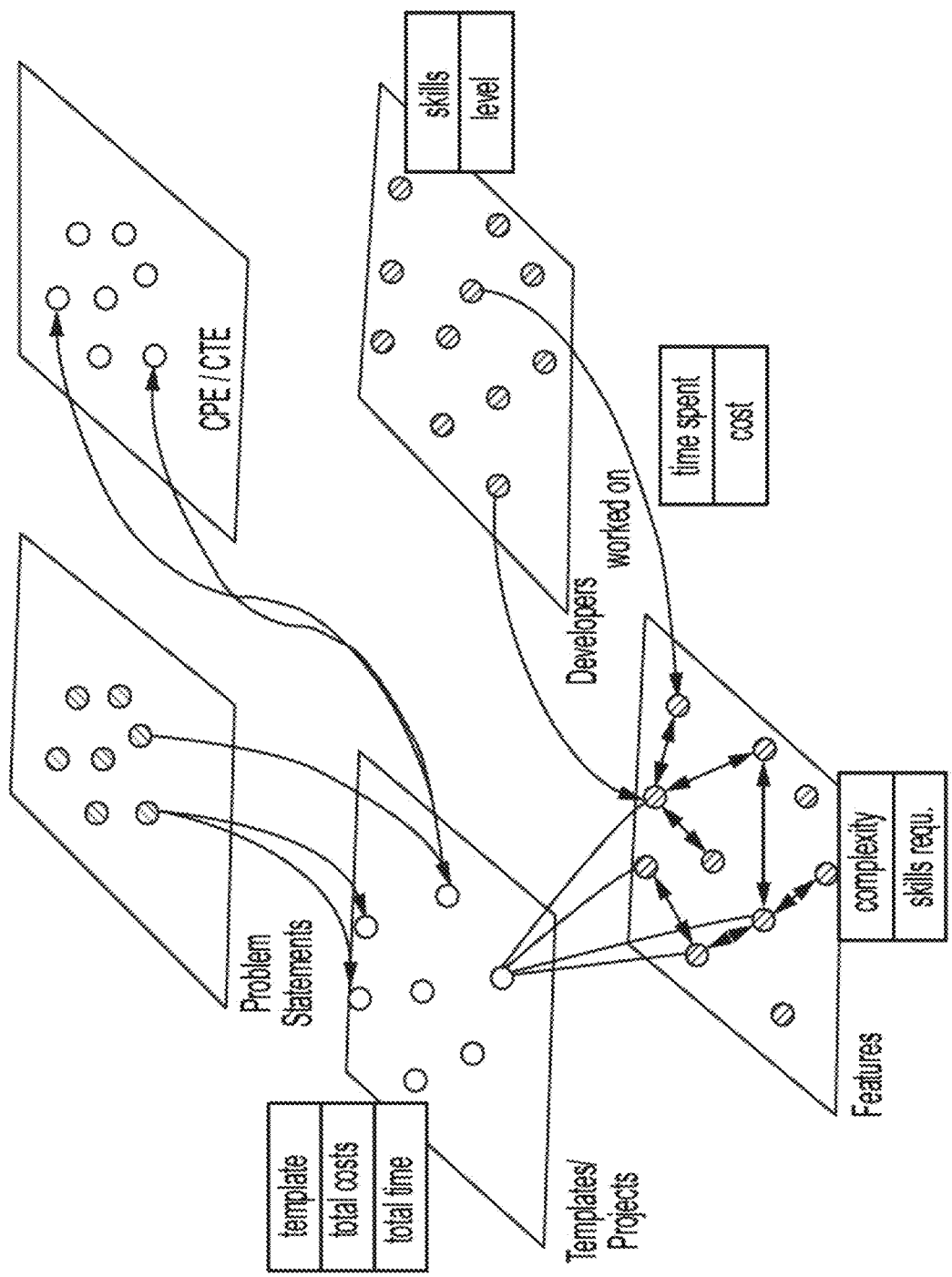
FIG. 45 illustrates a visual representation of different nodes types in the graph database according to an embodiment of the present invention.

The configured graph database incorporates nodes and entities from different processes or aspects of the platform which allows for interrogation and discovery of interrelationship and potential associations from paths containing connected nodes and edges across the different tasks, processes, or relevance. The graph database is not solely focused on the software elements that together form the software application for a software project but extends into other areas in the software platform and in so doing, provides a greater depth of performance. For example, FIG. 45 is an illustration that shows an implementation of nodes involving different aspects of the platform. FIG. 45 illustrates that the defined node types can be template, project feature, developer, CPE/CTE, and problem statement. Boxes shown in the diagram contain an illustrative set of attributes for each node type. For a particular project, the collected data that is instantiated in the graph database can include the range of all of the types of nodes and the edge connections.

In preferred implementation of embodiments of the present invention, four or five different entities (or nodes), the fifth being creator, are implemented to configure the software development platform are selected and used in the graph database process. The entities and corresponding node types are:

1. Feature: Features are the atomic unit of a real-world application that provide functionality to the app. The data around features is sourced from a content management database (part of the platform, which can be in features database for example). which can include features database of FIG. 3B, that contains preconfigured information such as meta data including connections or links to other features. A feature is also defined further herein.
2. Projects: A project is a collection of features. These are used to understand how some features combine to form a real world application. We source the data of our historical projects/build cards from a database that stores this historical information.
3. Templates: While projects contain some level of noise in them, templates are very well structured collection of features that form a real-world application. Also, the build card generation process allows a user to base their project/app on a template, it provides a fair amount of information around the type of a project. The template data is sourced from a database that contains the template to feature mappings, which can be in the features database of FIG. 3B. Template is also further defined below.
4. Problem groups (or Problem): Problem groups are groups of templates that solve similar types of problems. This gives us an insight into how features combine towards solving a particular kind of problems. The data around problem groups is sourced from the problem-groups table in a platform database (e.g., features database).
5. Creators: Creators or Developers are the key workhorses in a client project and are assigned to a project based on their skill and proficiency—(skill level) using the resource allocation tool (RAT). During the course of the project, creators are then assigned to several features—stories by the CPEs, information of which is recorded on a tracker process.

Graph schema that is defined in the platform and applies to the data is used to create and refresh the graph database. For example, the below tables show an example of graph scheme (the entities/nodes being explained above):

|   | A | B | C | D | E | F |
|---|---|---|---|---|---|---|
| 1 | Entities | Feature | Project | Template | Problem | Creators |
| 2 | Attributes | builder_id | builder_id | builder_id | builder_id | builder_id |
| 3 | | name | name | name | statement | email |
| 4 | | bundle_id | build_card_id | description | | vendor_name |
| 5 | | complexity | created_date | status | | country |
| 6 | | interface_type | updated_date | | | created_date |
| 7 | | price | start_date | | | total_hours |
| 8 | | time | end_date | | | communication |
| 9 | | is_core | cost | | | responsiveness |
| 10 | | description | security_deposit | | | delivery_ownership |
| 11 | | question | timelines | | | skills: expertise score |
| 12 | | embedding | status | | | nb_tracker_logins |
| 13 | | | brief | | | nb_cpe_feedbacks |
| 14 | | | speed | | | rejected_story_ratio |
| 15 | | | squad | | | on_demand_price |
| 16 | | | | | | rat_score_v2 |
| 17 | | | | | | |

Graph schema can include relationships between nodes such as:

|   | A | B | C | D |
|---|---|---|---|---|
| 1 | Entity 1 | Entity 2 | Relation | Relation Attributes |
| 2 | Feature | Feature | feature-feature | — |
| 3 | Project | Feature | project-feature | — |
| 4 | Template | Feature | template-feature | — |
| 5 | Project | Template | project-template | — |
| 6 | Template | Problem | template-problem | — |
| 7 | Creator | Project | creator-project | communication, delivery_ownership, responsiveness, skill_name, skill_expertise, skill_score |

Relations can also have their own set of attributes such as a count for an edge of how many times the same pair of nodes are connected with that edge.

Below are the details for each relation,
1. Feature—Feature Connections: The existence of an FFC relation between any two features signifies that those features are usually linked to each other in a real-world application. This data is sourced from database that stores "hero-sidekick" feature mapping data (stores information that includes link that are commonly or usually linked by human design and/or automatic determination). The database may also record as part of an attribute information about how many times the same pair of nodes are connected.
2. Template—Feature/Project—Feature: Templates and projects are related to features through this relation. This signifies that the connected feature is a part of that project or template. In terms of a project it means that the connected feature is a part of the build card of that project. In terms of templates, the connected features simply is a part of the feature pool that the template is made up of.
3. Project—Template: This relation connects projects to templates. Any user that lands on a studio interface for designing the application and starts to ideate their project, they are presented with an option to base their app on a pre-existing application template. If the user decides to base their app on a template, it gets added to their build card. This relation signifies that a particular project is based on the connected template.
4. Template—Problem: A lot of application templates are a part of some problem groups. This is based on the industry they belong to and the problem that they solve. For instance, the application template of Uber solves a city's transit problem, so it belongs to that problem group. This relation connects application templates to the problem groups that define the problems that the particular template solves.
5. Creator—Project: The existence of a creator-project link signifies that a creator was assigned to a given project. Moreover, each creator-project edge contains following attributes which provide a granular view of the allocation:

|   | A | B |
|---|---|---|
| 1 | creator-project | Description |
| 2 | communication | sum of CPE feedback score for a given project. |
| 3 | delivery_ownership | sum of CPE feedback score for a given project. |
| 4 | responsiveness | sum of CPE feedback score for a given project. |
| 5 | skill_name | Skill for which creator was assigned to a project - 'ROR' etc |
| 6 | skill_expertise | |
| 7 | skill_score | |

With respect to recommending features, the platform is adapted to provide the advanced capability using the graph database by being implemented in that process with the above four or five nodes and relations. These are the core or primary pieces that are operated on in the process. Other nodes or relations may exist in the platform. In preferred embodiments, the graph database algorithm and related processes for feature recommendation is configured to apply operations or algorithm on this 4/5 nodes and 4/5 (fifth being creator project) relations such as in the below described knowledge graph algorithm and embedding pipeline.

Figure 46:
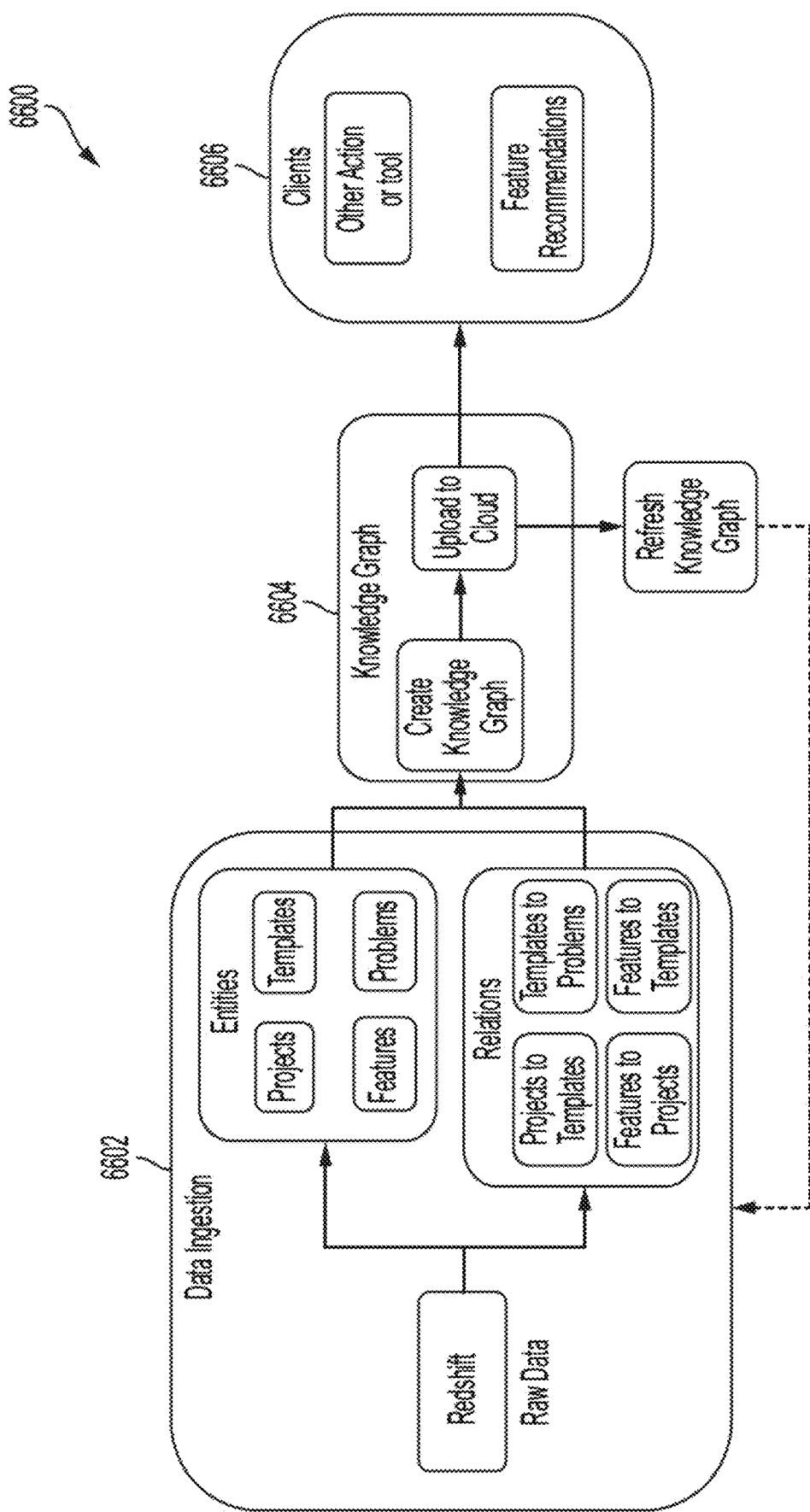
FIG. 46 is an illustrative functional block diagram of knowledge graph based recommendation tool according to an embodiment of the present invention.

FIG. 46 is an illustrative representation of an implementation of a subsystem 6600 of the platform. It can be a portion of an implementation of the platform in FIG. 3B. Subsystem 6600 can include data ingestion 6602 wherein raw data is collected from the internal activity of the platform (e.g., data taps that collect data for use in the knowledge graph). Data ingestion uses predefined graph data structures to create nodes from the raw collected data. As shown, the node types are projects, templates, features, and problems. Other nodes such as creator can be included depending on objectives. Data ingestion also uses predefined data structures to create edges or relations from the raw collected data. As shown, the edges (relations) are project to template, templates to problems, features to projects, and features to template. Additional edges can be included. In knowledge graph stage 6604 the platform creates or updates the knowledge graph (or graph database) using the nodes and edges created from the collected data during data ingestion 6602. The knowledge graph is copied to the cloud for use by software clients. Clients 6606 are configured to query the knowledge graph to provide certain functionality. Clients 6606 include a feature recommendation client that for example, sends a set of features selected by a customer for a project to the knowledge graph and in response the set of features are applied to the graph database and one or more recommendation for other features that are found by the knowledge graph is identified and communicated. To clarify, a new project can include a template or problem and in turn these include one or more features (that embody the template or problem). In addition, the traversal algorithm can include the use of particular node attributes as basis for whether to traverse or identify paths (or groups of connected nodes and edges). For example, features may have an attribute of advance, intermediate, and beginner. The platform can for example apply an algorithm that traverses only intermediate features combined with some other attribute to quickly generate relevant information that can for example be used to control the design or operation of the platform.

Figure 47:
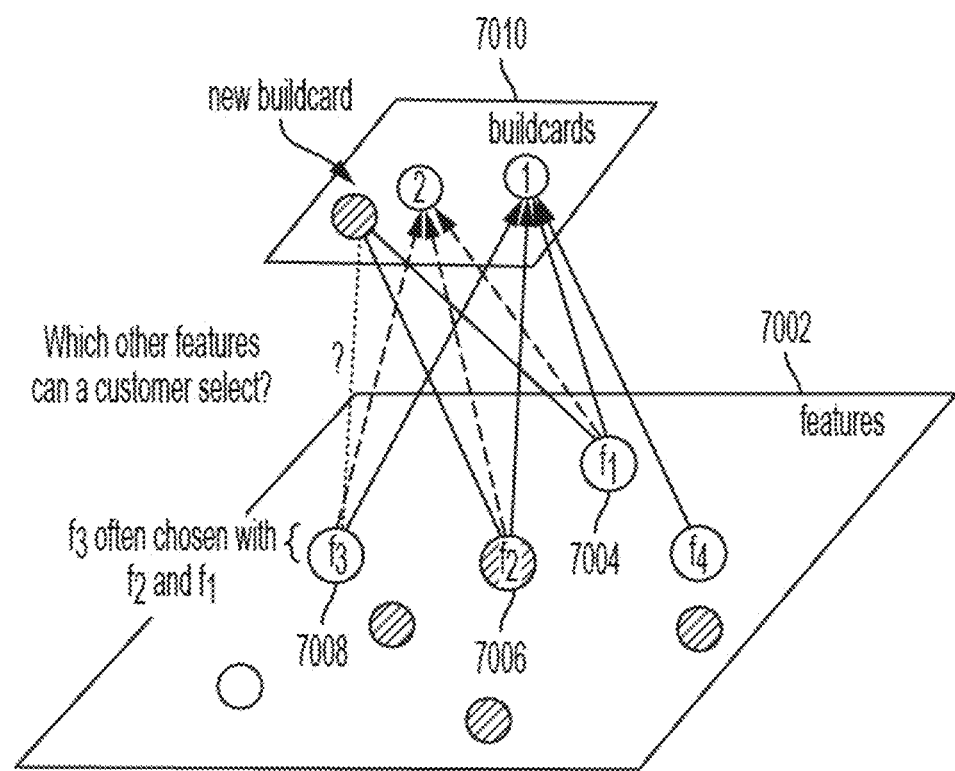
FIG. 47 illustrates a visual representation of a new build card and relation to graph database for illustrative recommendation tool according to an embodiment of the present invention.

Now with reference to FIG. 47, an illustrative diagram is provided that demonstrates one type of query, response, and graph database algorithm that can be applied to provide an improved and advanced software development platform. Plane 7002 is a conceptual representation of the domain for a node type, which is in this case are features. The nodes in plane 7002 represent different features that are available or have been deployed in the software development platform to design or scope a project. Nodes are not the source or object code for that particular features but represent that entity in name and values of the attributes that are associated with it. If desired, each node can be linked to its corresponding source code (file) or object code (file). Plane 7002 includes nodes f1 7004, f2 7006, and f3 7008. Plane 7010 is a conceptual representation of a customer's build card (one in the process of defining project scope, selecting templates or features for the project). The customer, as shown, has interacted with the software development platform to selectively add features f1 and f2 to the build card. The platform, preferably in response, queries the nodes and edges of the graph database, for example by sending the customer selected nodes to the graph database. The graph database and platform can be adapted to receive and handle this particular of query. The graph database applies a corresponding algorithm, in this case additional feature recommendations to generate output from the graph database, which can include related information stored in the database. There can include having different algorithms adapted for different situation that are configured to apply a different operation or analysis on the graph database (e.g., node traversal or identify similar nodes).

In this situation, of FIG. 47, the platform by applying the algorithm determines that customers that chose f1 and f2 often also chose f3. This as mentioned can be based on the number of times (an attribute) those edges were previously assigned between those nodes (in 10 past project or 100 past projects). FIG. 47 illustrates that f1 7004 was selected for a build card along with f2 7006, f3 7008, and f4, and f2 7006 was often selected for a build card with f1 7004 and f3 7008. The diagram illustrates that the graph database using the algorithm would be able to determine that f3 7008 is "linked" (e.g., pointers, software parameters, logical structure) to the two features in the build card and can generate an output identifying f3 as an additional feature (suggested feature) for the user to add (or to automatically) add to the build card 7010. This may appear simple but in the context of large scale data set and a software development platform involving many features and significantly more ingested projects, the determination is complex and difficult to determine in known software development platform technology.

Figure 48:
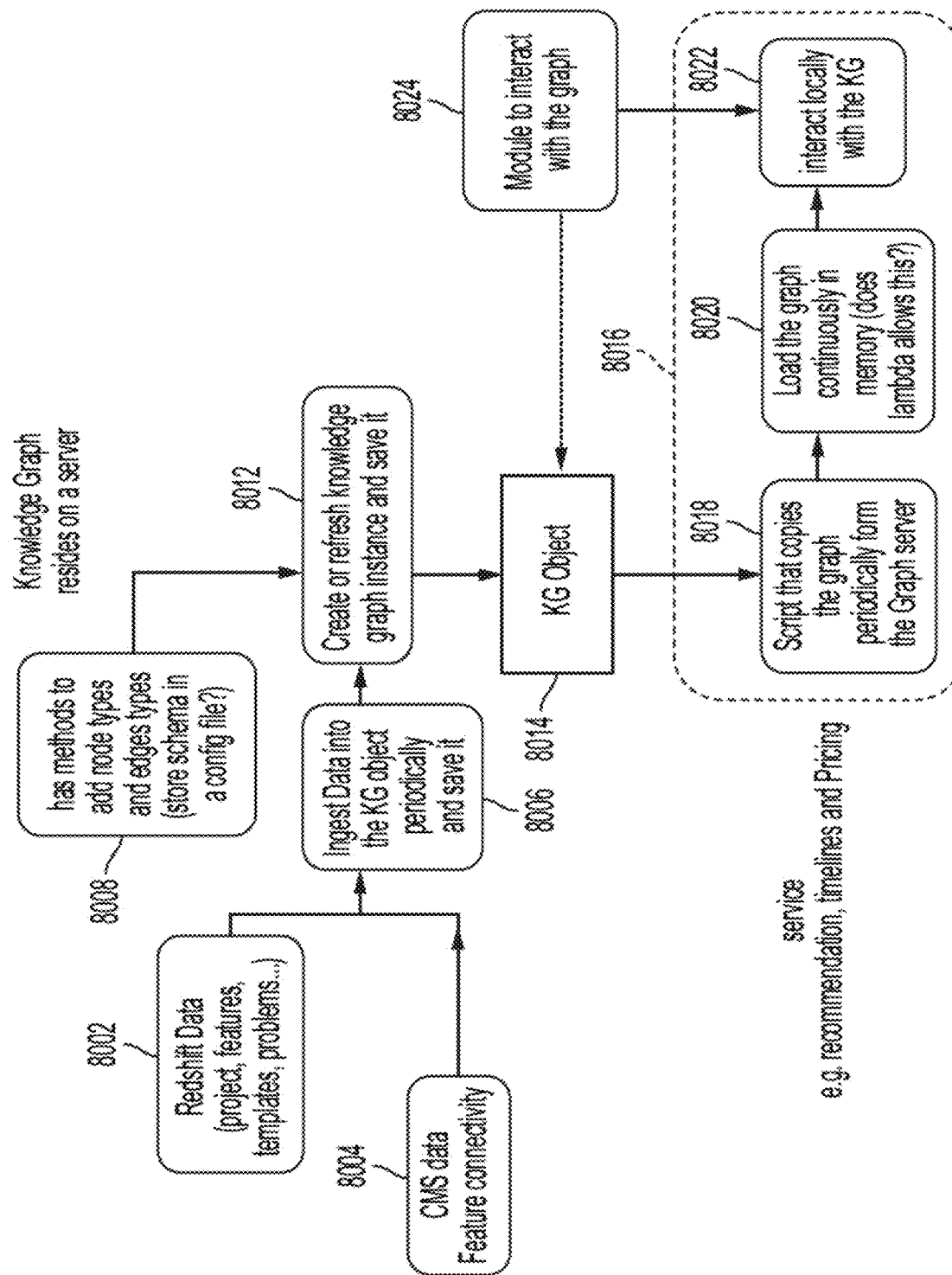
FIG. 48 is a functional block diagram for producing, updating, and making the graph database live in the system according to an embodiment of the present invention.

With reference now to the functional block diagram of FIG. 48, in implementation the platform can be configured include a server on which the graph database resides. The platform can be configured to include a method that updates, maintains, and delivers the services to platform processes. As shown, data is provided in 8002 for incorporation into the knowledge graph where the data is in different planes (categories or types of nodes) such as project, feature, template, and problems. The content management system that stores data related to feature connectivity is provided 8004 within the platform in order to provide such data. At step (or function) 8006, the provided data from 8002 and 8004 are ingested periodically and saved. At 8008, the platform is configured with graph scheme and includes methods for adding new node and edge types. The platform is configured at 8012 to create or refresh the knowledge graph instance and save it. The is performed using the graph schema and ingested data to create or refresh an existing graph database with the new data. The knowledge graph is saved in Object 8014. The platform is configured to use this as the resource for continuing to update the knowledge graph without affecting related services that interact with the graph database. The platform would want to continue to update or refresh the graph database while also providing a live steady resource for use and interaction in the system. The platform is configured to isolate or buffer the ingestion, creation, and refresh of the graph database so that for example is running independently on a server separate from platform operation in providing processes to customers, developers or others. The platform is configured to store the diverse large scale data ingested and in accordance with the graph schema in the graph database which contains a wide range of nodes and edges comprising a wide range of software development entities and relationships on the software development platform. The graph database and related or supporting functions or functionality is specifically adapted for software development platforms and feature recommendation such as by having graph schema providing for the node types identified herein.

To provide services 8016, a script is used to copy the graph database in its then current form after recent ingestion, creation (or refresh) from the graph server, from object 8014. In services 8016, the copied graph database is loaded into the memory for the services and at 80022, the platform is configured to interact with the loaded graph database to provide feature recommendations. Once copied it is made "live" for use in the platform. Module 8024 is implemented to allow the services to interact with the graph database in the production phase of the database.

The nodes and edges can be configured to be directed such that edges point in a direction such as from project to features that were included in that project.

In some embodiments of the present invention, node embedding is implemented from the graph database. For the purposes of discussion and operation, the node embedding and related structure or method is considered part of the graph database functionality and related elements. The platform can rely on node embeddings derived from the knowledge graph. The knowledge graph is likely in practical implementation in constant evolution, which means that relevant embeddings are themselves in constant evolution. In addition, each service or software client of the platform may rely on a different setup for the embeddings. For example, one application may require one algorithm to generate embeddings (e.g., Metapath2vec) while other applications will require another algorithm to generate embeddings (e.g., Graph Sage). The operation of these algorithms can be located from Internet websites.

From a production point of view, platform implements a pipeline that regularly updates the required embeddings for each application. From a development point of view, the platform is configured to create a package that allows any relevant developer of a particular application to generate embeddings on the fly given a particular setup.

More specifically, from a production perspective the platform is configured to be implemented to:

- whenever the knowledge graph is refreshed for an application or service (application or service in this context referring to the software in the platform that uses the knowledge graph to provide one or functions or capabilities), the platform can determine if the knowledge graph changes also affect the embeddings required for the application or service (e.g. new entities added or new edges added);
- different embedding setups are provided for different application or services, and when refreshed the right embeddings are uploaded to the right application or service; and
- include embedding generation separate from the primary operation of the platform comprising, for example, project scoping process, pricing, project management, and testing in order not to slow the performance of the platform and to avoid the platform breaking down.

Preferably, the platform is configured to trigger the training of the embedding locally. The package software components and method(s) that implement this capability should be very simple to use and preferably only requires as input the algorithm name and a hyperparameter. In a current embodiment, each application or service in production has a configuration file in the form of a Json file: the Json have two entries, the first entry is the algorithm name (e.g., Metapath2Vec) the second entry is itself a json that specifies the hyperparameters of the algorithms (e.g., metapath_dict, window_size, etc.).

There may also be a readme file in the embedding package specifying the list of hyper parameter names corresponding to each algorithm name. Once the pipeline is triggered the first steps consists in fetching the configuration for each application or service to form a master configuration, run embedding generation for each configuration, for each configuration in the master configuration file, preferably first verify that the required data for the embedding generation changed and preferably only in this case run the embedding generation and upload the resulting embedding to memory thus replaces the old embedding for this particular configuration.

Figure 49:
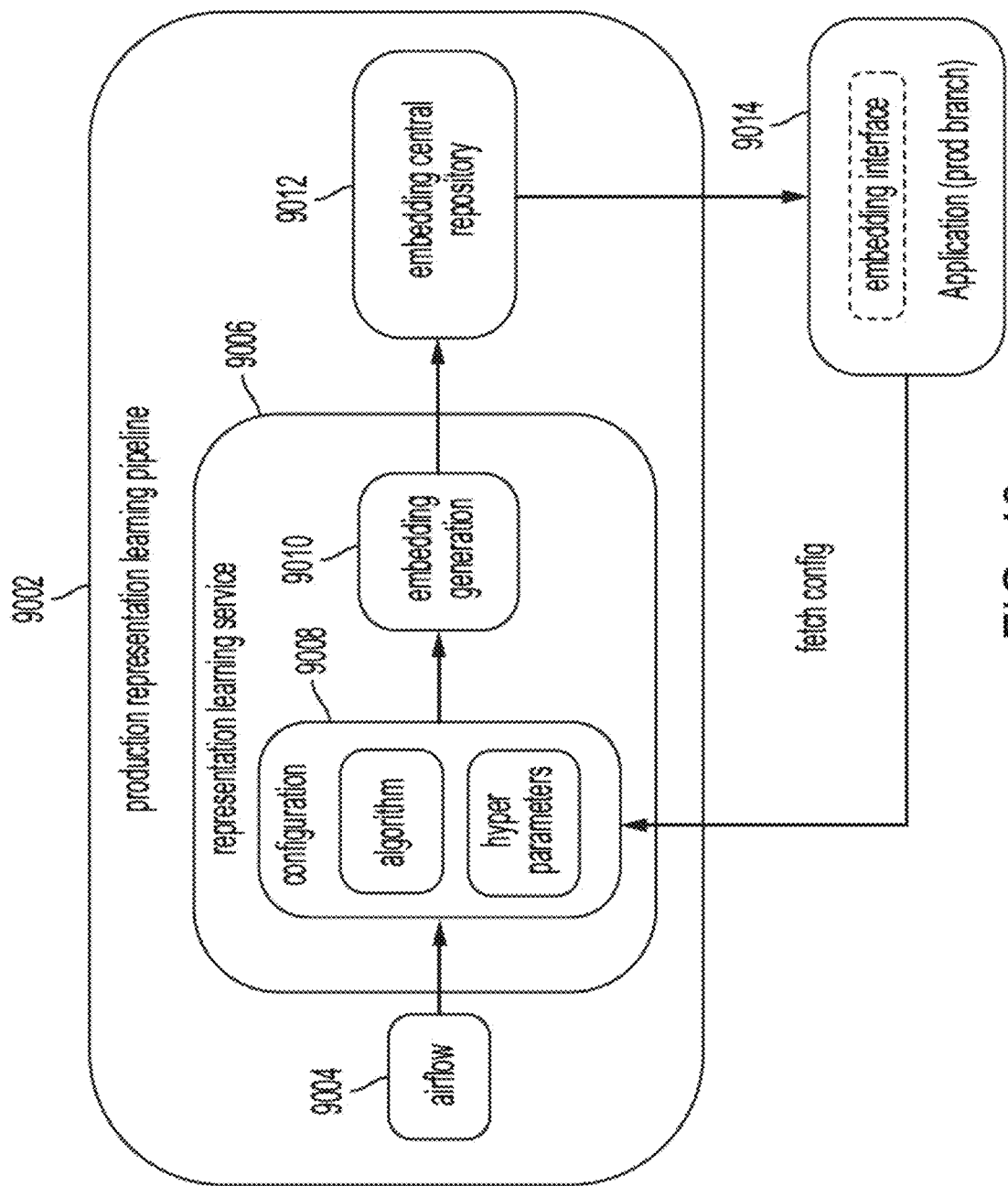
FIG. 49 is a functional block diagram for a knowledge graph incorporating node embedding into the tool according to an embodiment of the present invention.

Now with reference to FIG. 49, an illustrative generation pipeline is provided as implemented in some embodiments of the present invention, the pipeline is configured to use the graph database to generate different node embeddings that are adapted for different desired services, clients, or applications. The pipeline or components thereof can be implemented in combination with graph database in order to provide computational simplification, higher relative speed of information retrieval while maintaining accuracy, and adaptability or dynamic ability to be tuned to different needs in the platform and provide on-demand support due to the pre-generation of the embedding prior to the need for handling a query or other analytic operation. The embedding can also be loaded into memory or tables that are not graph databases which are easier to store and perform mathematical operations on (e.g., a conversion from graph database to n-dimensional vectors that are better adapted for computer operations). In operation, the platform is configured to provide feature recommendation in real time in response to a query for a recommendation comprising selected features. This can be performed for example using the graph database and embedding arrangement. Real time refers to instantaneous or immediate response in relation to the receipt of the query.

Pipeline 900 can include control 9004, representation learning service 9006, embedding central repository 9012, and application (production branch) 9014. Representation learning service 9006 can include configuration selection component 9008 and embedding generation 9010. Control 9004 comprising one or more control commands that trigger or control the operation of the pipeline or elements thereof.

Configuration selection component 9008 is configured store different algorithms used to generate embedding. The algorithm can be specifically selected for example a corresponding platform service or software client such as feature suggestion. The configuration selection component 9008 includes hyper parameters that are parameters that store configuration information for the parameters. Each stored hyper parameter is used to configure a corresponding algorithm to be adapted to provide the desired functionality. The hyper parameter and algorithm (or link to algorithm) can be stored and fetched from application production branch 9014.

Embedding generation uses the selected algorithm configured in accordance with the hyper parameters to perform node embedding by applying the selected (configured) algorithm to the graph database and the algorithm generates an n-dimensional vector space (n represents the number of columns of vector). The n-dimension vector reflects the structure of the refreshed or created graph database (wherein there is each node is represented by its corresponding vector) and contains data value that are adapted using the corresponding algorithm to identify or communicate similarities, explicit relationships, likely relevant edges, similar nodes or similar paths (a path being a series of node and edges that form a connected chain that can be traversed without breaks). The pipeline 9002 can store the different node embedding in central repository 9012.

With this approach, the provider of the platform can have its developers be free to use the information in the knowledge graph in many different ways and free to select and configure an algorithm for the node generation that best suits each new service or software client. The developer can select the algorithm and its hyper parameters, and can load that into the application production branch 9014 or storage associated with pipeline 9002. The pipeline can run the different node embedding by fetching its configuration file (the algorithm and hyper parameters) and update the node embedding by applying the adapted/tuned algorithm to the current knowledge graph. The service or software client can then retrieve the corresponding nod embedding when the service or software client is executed in the platform. This can provide a robust and highly efficient and quick mechanism for providing the depth of intelligence in a vast and diverse knowledge graph to many diverse set of services or software clients on the platform dynamically or on demand. When implemented in combination with system of FIG. 48, the pipeline is operation on the production copy of the graph database in services 8016 to provide the node generation as opposed to the graph database stored and maintained separately that is used for refreshing or creating the graph database. This may cause the graph database to potentially be not as current but it avoids conflicts or interference in operation if for example the graph database is used simultaneously for both. It should be understood that in some embodiments, simultaneous use is contemplated.

As such, the software development platform can be configured to include embedding generation that generates an embedding comprising a plurality of n-dimensional vectors that in accordance with an embedding algorithm represent the graph database, each n-dimensional vector corresponding to a node in the graph database and comprising vector values based on relationship to other nodes in the graph database. The software development platform can be configured to store a plurality of different hyper parameters corresponding to different software tools (services, software clients such as feature recommendation) on the platform. As explained above, the software development platform can be configured to control the embedding generation with the hyper parameters and generate different embeddings and store the different embeddings corresponding to different software tools.

The software development platform can be configured such that a query (a query seeking information from graph database) is applied to the embedding to generate an output for the control of an operation, display, or recommendation. The software development platform can be configured to include a software tool that suggests a feature to add to the software project based on the embedding. By another example, the software development platform can be configured to include a software tool that determines another control or action over the software such as a connection or link being added between two features in the catalogue (in the feature database as part of the predefined characteristics of the feature prior to the design process) (and displays screen to show and/or carry out the action) based on the corresponding embedding. The software development platform can also be configured to control or suggest a portion of software project to be assigned to a particular developer based on the embedding (values in the n-dimensional vector).

As such an integrated online software development platform integrates among its many functionality and diverse data machine learning across that is flexible and on-demand for incorporating machine learning tools that control the operation of the platform such as to control options that are presented. The architecture can also be implemented to control the arrangement and/or connections between features in a software project or other design or development functions using the graph database and/or embedding technology.

Figure 50:
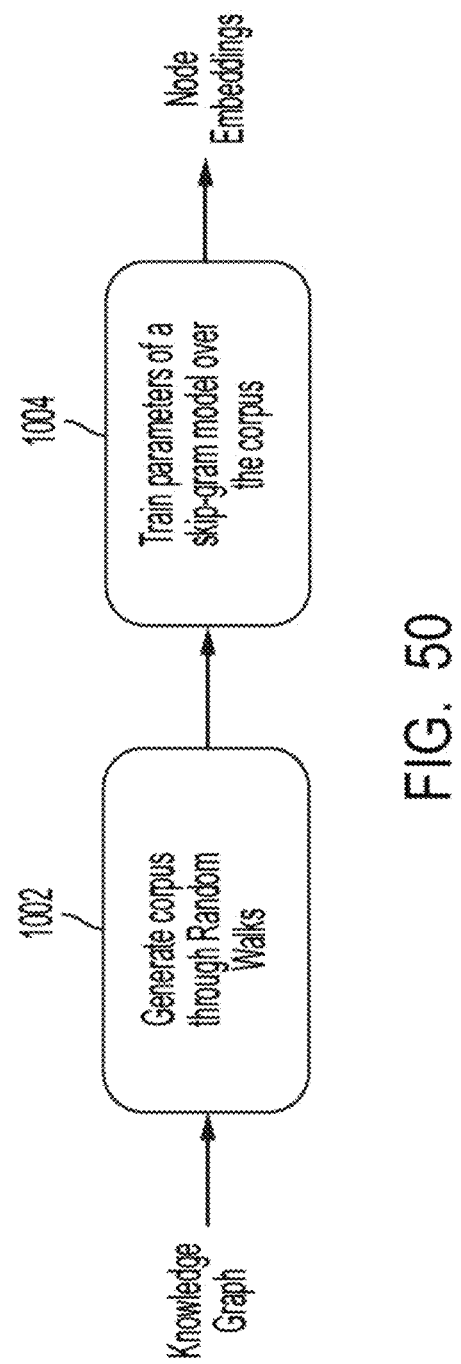
FIG. 50 is an illustrative method for providing node embedding according to an embodiment of the present invention.

With reference now to FIG. 50, the process involving knowledge graph and embedding is further described. At step 1002, the platform applies an algorithm to the knowledge graph. The algorithm performs random walks through the knowledge graph to generate a corpus. The corpus refers to paths (node-edge-node) sequences in the graph that meet the traversal requirement of the algorithm. The collection of those resulting/identifying paths is the corpus. The algorithm can be configured to limit the number of traversals to for example 40 nodes. At step 1004, the platform trains parameters of a skip-gram model over the corpus to generate the embedding. The method of FIG. 50, preferably provides node embedding generation through Metapath2vec, which can be found at Dong, Yuxiao, Nitesh V. Chawla, and Ananthram Swami. "metapath2vec: Scalable representation learning for heterogeneous networks." Proceedings of the 23rd ACM SIGKDD international conference on knowledge discovery and data mining. 2017, which is incorporated herein by reference in its entirety.

Figure 51:
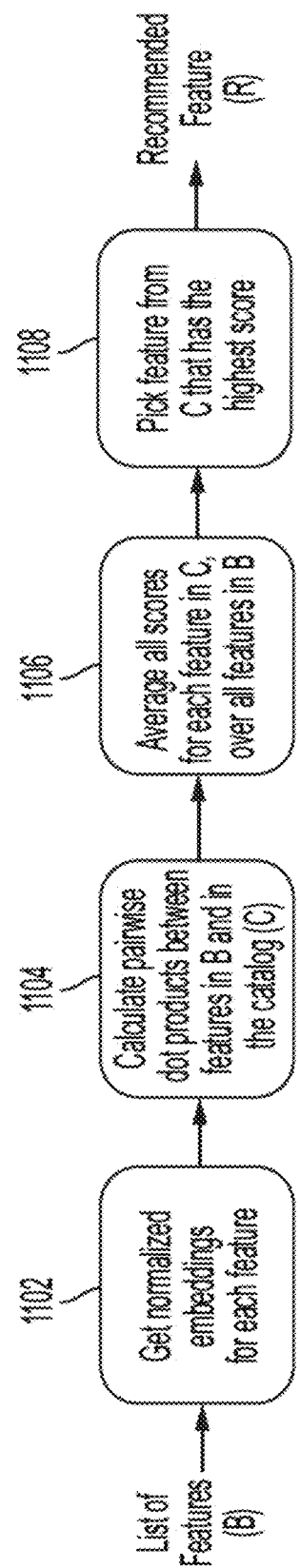
FIG. 51 is an illustrative method for generating a score and recommending a feature according to an embodiment of the present invention.

With reference now to FIG. 51, in operation, to receive a recommendation, a list of selected features can be transmitted (as a query) to the knowledge graph capabilities. At step 1102, the platform retrieves embedding (vector), that has been generated, for each selected feature. At step 1104, the platform calculates pairwise dot products between the embedding (vector) of each selected feature and each feature in the feature database of the platform (or depending on situation some subset thereof or all features). At step 1106, the platform determines the score of each feature (not selected features in the catalogue or available on the platform). The platform averages the dot product each feature in the feature database (obviously not included a selected feature) with each selected feature over all of the selected features. For example, if the customer (in a very oversimplified example) selects f1 and f2 and the catalogue includes f3, f4, and f5. The process (for the score f3) involves the dot product of f3 and f1 and determining the dot product of f3 and f2, and then adding those to results and dividing by two (to obtain the average). Other implementations are contemplated. At step 1108, the platform determines the feature in the feature database that has the highest scope and selects it to be the feature recommendation. In some embodiments, the top so many such as two or three can be selected. In preferred embodiments, as described, collaborative filtering based recommender is implemented using the graph and embedding. Embodiments of the present invention describe particular implementation details such as graph scheme, algorithm/embedding (for traversing and determining vectors), and/or node types that are particularly suited for feature recommendation in the field of technology. Other application or tools are not excluded by the discovery or discoveries.

In some embodiments, the platform may have include a plurality of different nodes in implementation the recommendation feature, the platform is configured to operate only certain types of nodes in the graph database such as project and feature nodes to provide the recommender tool.

Figure 52:
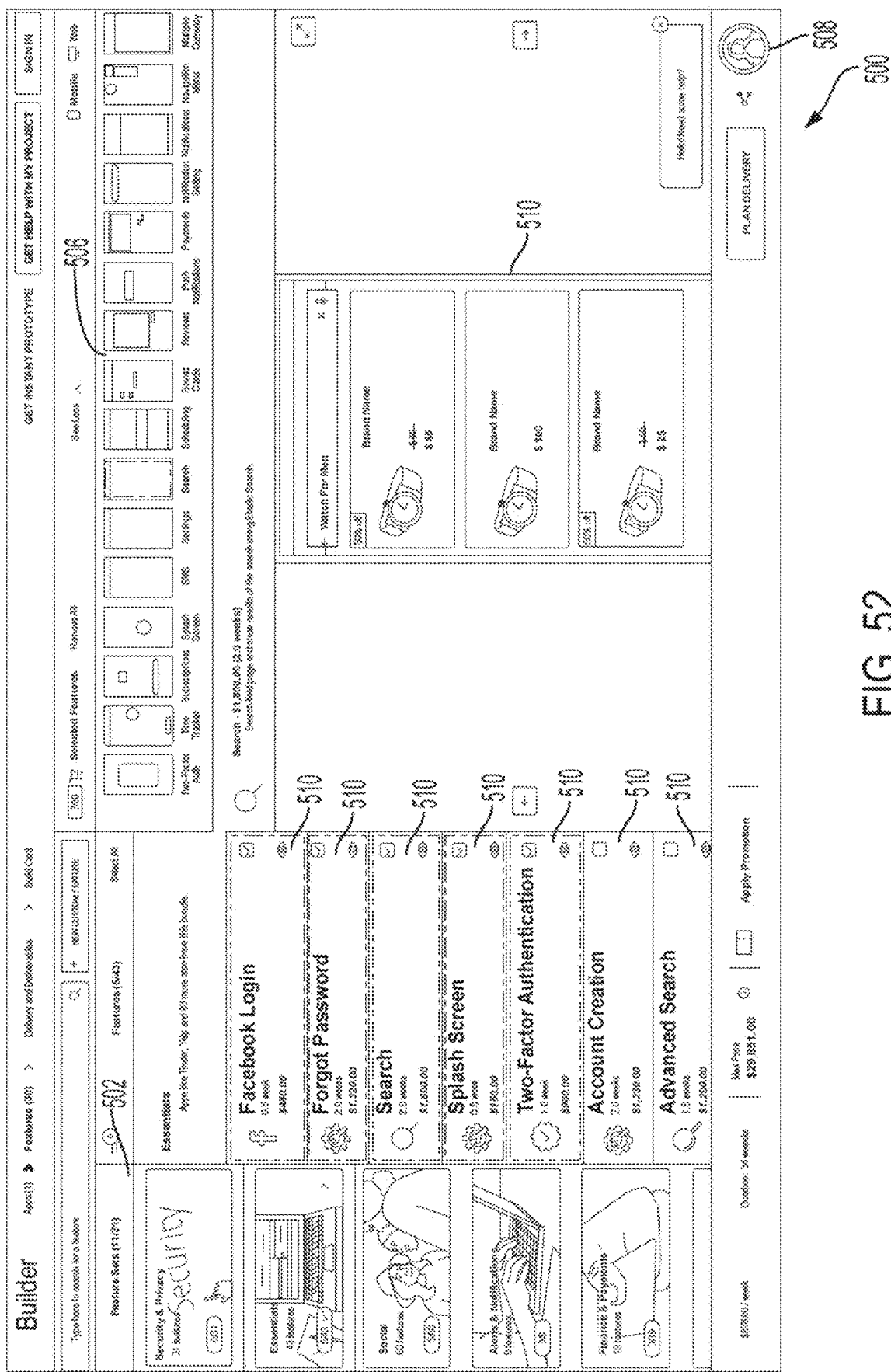
FIG. 52 illustrates an interface of the software application according to an embodiment of the present invention.

FIG. 52 illustrates an exemplary graphical user interface 500 according to an embodiment of the present invention. The graphical user interface may be displayed in a web browser of a client computing device as part of a web page served by a server. The graphical user interface of embodiments of the present invention is configured to enable a user to select from a library of software features 510 to build a software application.

A feature of the software application is a function or set of functions for the application. Conceptually, the feature is the atomic unit of the software project, according to embodiments of the present invention. That is, a feature is an independent unit of predefined functionality that comprises the basic building block of the software according to embodiments of the present invention. Accordingly, a feature is the smallest unit of the desired software application that the customer can employ (or need conceptualize). Further, if desired, a feature can be employed in disparate applications with minimal to no change to its core functionality, as will be described further down in this specification. This modular nature of the feature enables embodiments of the system of the present invention to build a prototype merely by logically connecting a selected set of features.

A feature may include a functionality that can be implemented in a modular fashion and that can be interchangeable between multiple software applications. For example, a feature that requires a user of software application to login (or a login feature) can be implemented using the same code and screen or interface across multiple software applications. Other features may require the same core code across multiple applications and platforms but differ in details. For example, an Account Creation feature may differ in details from one application to another depending the information that the account creation requires from the user. To that end, the software development platform of the present invention enables the user to customize a feature without modifying its core code and functionality and therefore without affecting its interchangeability between software applications.

The library of features 510 may be presented as a set of icons, a list, a drop down menu, or any other means of presenting information on graphical user interface. Graphical user interface 500 includes feature sets area 502 that displays a list of different feature sets such as security or social. In response to a user selecting one of the feature sets, the list of selectable feature that are displayed adjacent to them are updated with the corresponding features in that set. Display area 506 displays an icon representation of each selected feature that comprises a miniaturized view of this what the corresponding display is represented to look like. Area 510 displays a selected one of the icons from 506 such that the user can view a larger view of feature by selecting from the different icons. Option 508 can activate a automated expert that assists the user including providing feature recommendations. A project can be specified and accepted by the user to contain a set of selected features (e.g., as a result of the selection of template, the features that defined the template are selected and added to the build card for the project). The user can interact with interface 500, for example, after initially selecting a template or problem in a previous screen to review and evaluate the features in the current build card and add new features from area 510 or remove features by interacting with 510 or 506. Interactive display area 506 identifies the selected features in the current build card and is configured to scroll laterally to allow the user to peruse the features if the screen is too small to show all of the features. Interface 500 may include a button or option such as expert option 508 that when selected in response display text that as one options displays one or more feature recommendations for the current project. In response to the user, selecting to add that recommended feature, the selected (recommended) feature an be added to the features to the current build card be displayed in interactive display area 506 and if "clicked" by a user, displayed in "zoomed" form in interactive display area (portion of display screen) 510. Using the interface 500, the user can define all of the features that are to be contained in the current project.

Figure 53:
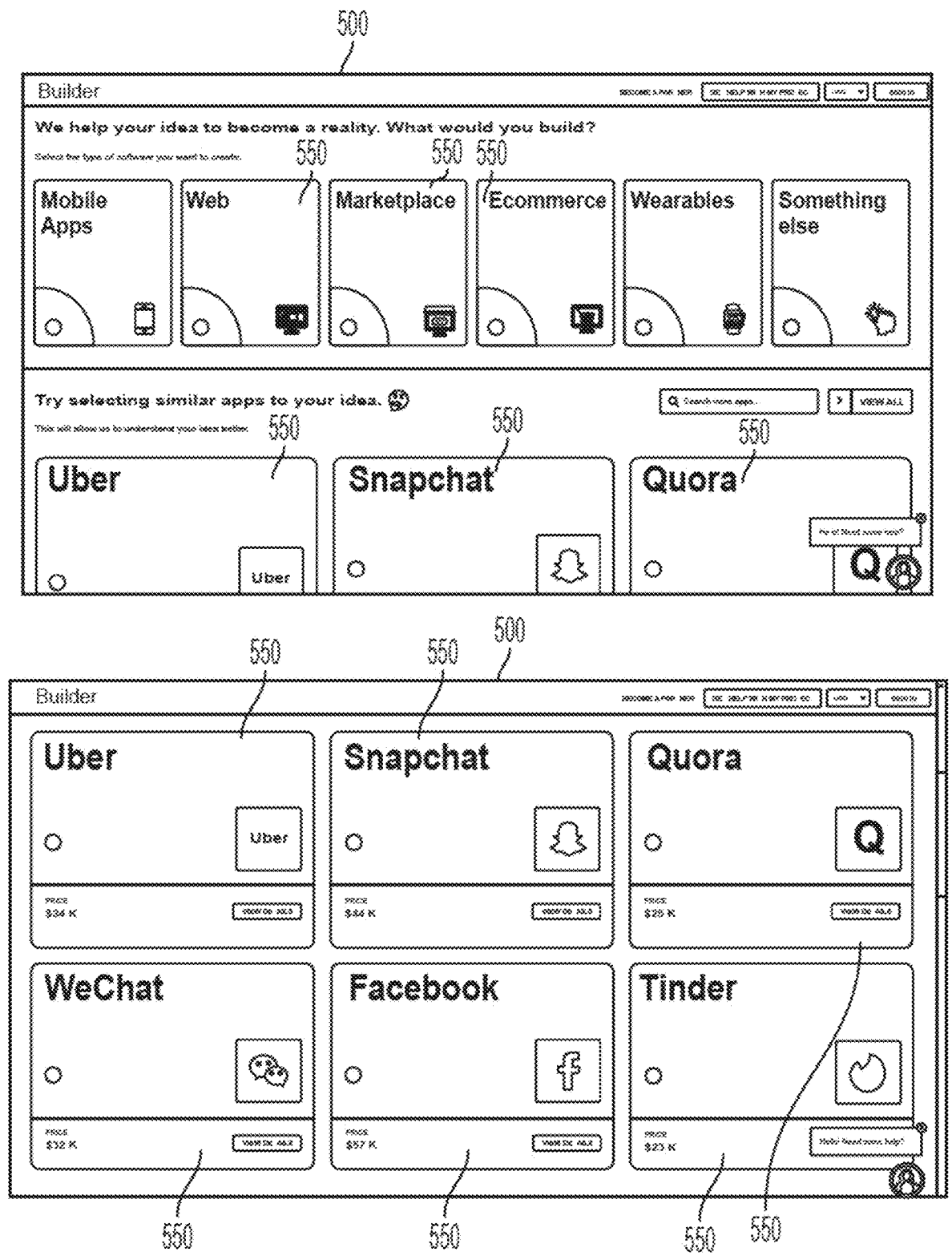
FIG. 53 illustrates an interface for using templates in the design process according to an embodiment of the present invention.

A template means a preorganized set of the library of features, which are available on the system as a way to associate particular template idea with set of curated features for that template. To clarify, in some instances the term project template is being used to refer to a framework, build card, or project specification. FIG. 53 illustrates graphical user interfaces 500 displaying a library of templates 550, according to an embodiment of the present invention. Each template 550 of the library provides the basic functional architecture and visual layout of the software project. In particular, the template 550 provides a predefined and customizable basic process flow process between a set of predefined and customizable features or functions of the software application. The library of templates 550 may be displayed on the graphical user interface 500 as a set of icons, a list, a drop down menu, or any other means of presenting a set of information on a graphical user interface.

In the embodiment illustrated, the templates 550 are grouped by types of software, such as mobile applications for mobile devices, web applications for website, marketplace applications that help buyers and sellers transact in real time, e-commerce application, applications for wearable devices such as apple watches or google wear, or any other types of applications that may be available on consumer devices. In the embodiment illustrated, the graphical user interface 500 further provides examples of templates within each grouping of templates. For example, the mobile application grouping may include a list of mobile application templates such as Uber, Snapchat, Quora, Tinder, or other popular mobile applications that a customer may want to use as a model to communicate requirements for their own application. A social media grouping for templates may include Facebook, Snapchat, Instagram, and templates of other social media applications. It should be noted that Applicant is not affiliated with the providers of the above applications and services whose structures may provide bases for templates in some embodiments.

After the user has selected a template 550, the user is provided with the opportunity to customize the software project by adding features to or removing features from the template (e.g., FIG. 2). In some embodiments, the interface may display a set of pre-selected additional features specifically corresponding to the template. For example, if the chosen template is that of a social media app, the user may be provided with additional relevant features such as Private Messages or Take Photo (in FIG. 52). Thus, the system enables the user to build software by either selecting features individually (e.g., "a la carte") or selecting a predefined set of features or a template, building upon the template by adding or subtracting features to form the software project.

Referring back to FIG. 3B, in some embodiments, the builder software 440 on the server 430 may further comprise process 485 which can comprise feature selector configured to select a set of features based on input from the user. In such embodiments, the client device 410 may prompt the user with various questions for specifying the type of software application and broad set of features desired, rather than presenting the user with a list of specific features. The feature selector 455 is configured to translate the user's input into a set of features to be integrated to form the target software application.

After the selection of features, or the selection of a template and if desired, a set of additional user-selected features for the template on the graphical user interface, the features are transmitted to the server 430 from the client computing device 410. The template would be understood as discussed herein to include a set of predetermined interconnected features that correspond to a particular model. As described above, the selection of features may also be generated by a feature selector that receives as input answers to prompts from the user interface and generates a selection of features therefrom. Upon receiving the selection of features from the client computing device 410, the builder application 440 transmits the set of selected features for example to the knowledge graph and supporting capabilities.

A project, in the context of a node type, means a node created for a past or current project that is saved by a user or customer and as part of the process of the platform includes a set of selected features.

Figure 54:
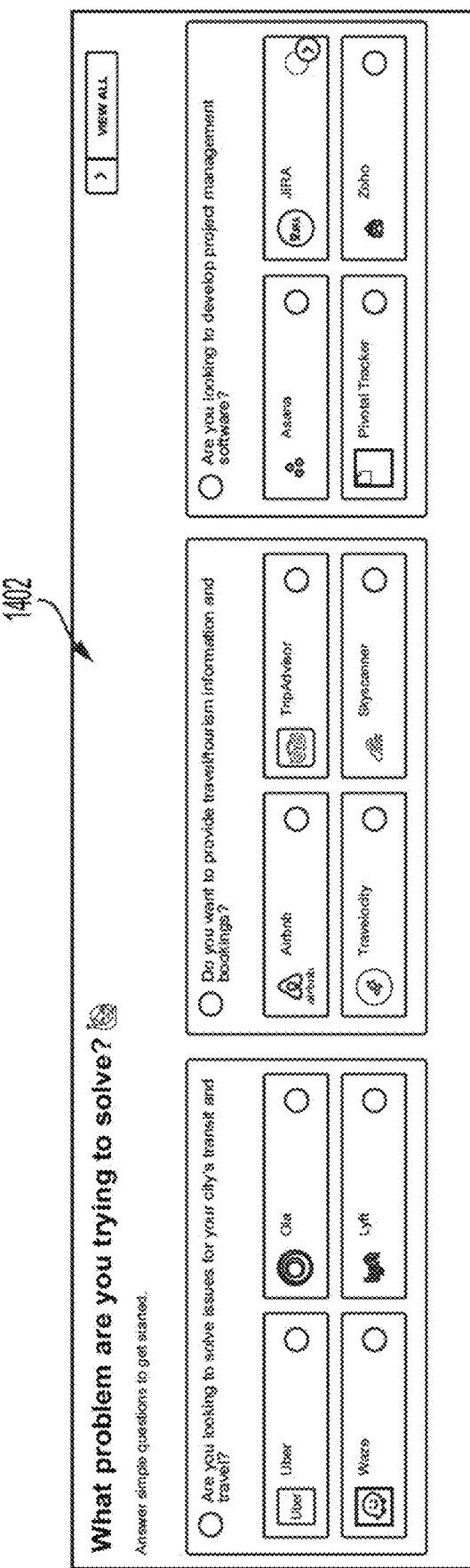
FIG. 54 illustrates an interface for using a problem/problem group in the design process according to an embodiment of the present invention.

FIG. 54 illustrates an example of a portion of display screen that can be displayed to the user as part of the projects scope process. The platform can display areas that provide selectable problems (discussed above). The platform can then in response select the corresponding features that correspond to the selected problem. In this option, the platform can give the user to select/unselect templates within a problem before deciding to submit it as the user's selection.

Figure 55:
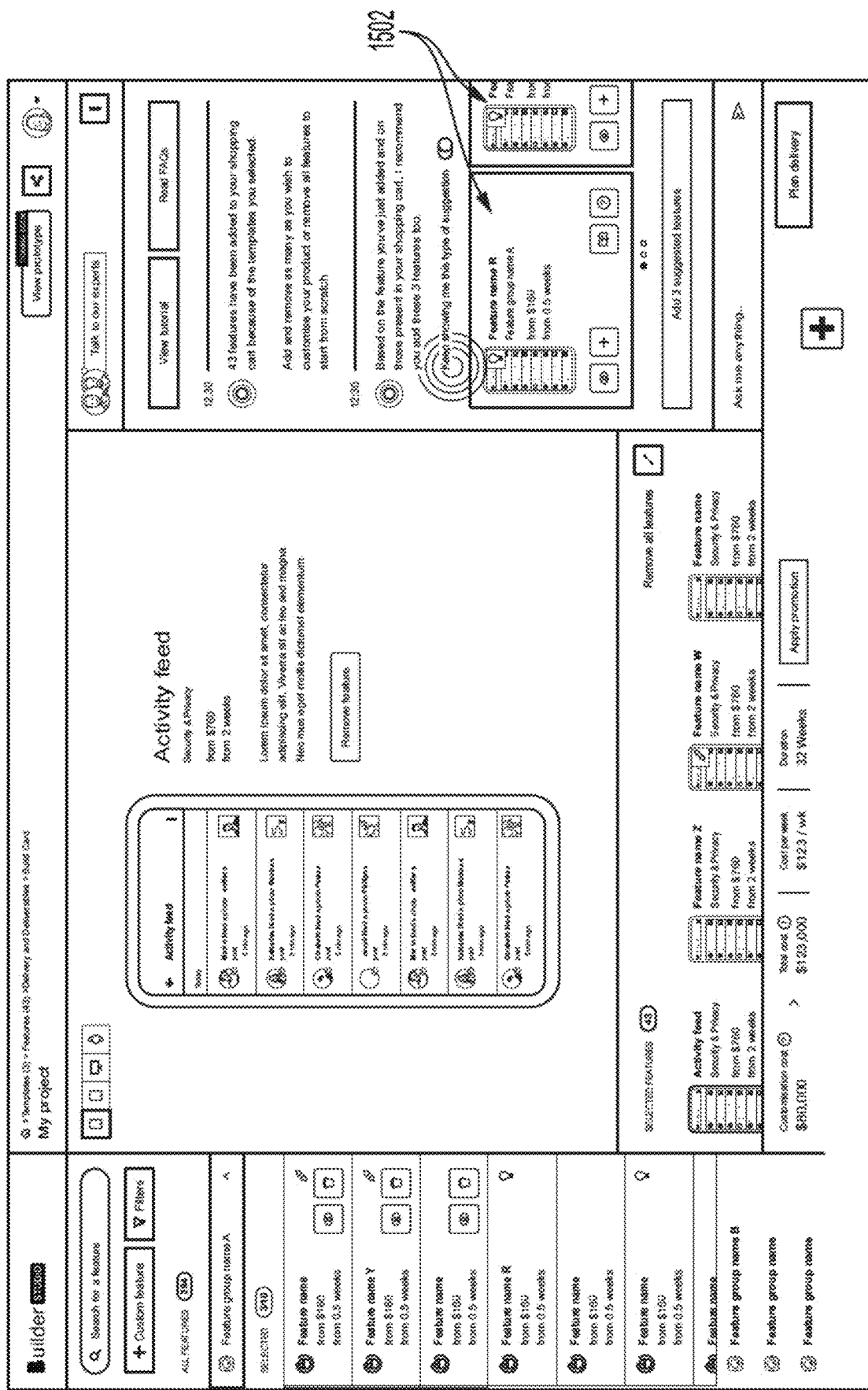
FIG. 55 illustrates ones type of interface or interaction with the user in which the platform provides one or more feature recommendations to the user according to an embodiment of the present invention.

FIG. 55 illustrates that platform can be controlled to display selectable feature recommendations to the current user in the display screen in area 1502. In response to interactive with the expert assistance or other element as a button, the platform receives the results from the query based on the selected features of the user and displays one or more selectable features to the user. The display permits the user to select the one or more features and in response, adds the recommended features to the user's selected features in the design process. If the features are the approved or accepted, those set of features proceed in the platform to the next stage such as to generate source code.

In the context of graph databases (involving nodes and edges), it is understood that an edge is used to characterize direct relation (connection) between two nodes (e.g., directionally).

An algorithm applies to the graph database can for example apply a criterion such as identify all projects that include some or all of the selected features in the build card for the current project. In doing so, the algorithm my ignore or stop traversing paths for a project that does not have any of the selected features.

Each of the system, server, computing device, and computer described in this application can be implemented on one or more computer systems and be configured to communicate over a network. In one embodiment, the computer system includes a bus or other communication mechanism for communicating information, and a hardware processor coupled with bus for processing information.

The computer system also includes a main memory, such as a random access memory (RAM) or other dynamic storage device, coupled to bus for storing information and instructions to be executed by a processor of the computer or computing device. Main memory also may be used for storing temporary variables or other intermediate information during execution of instructions to be executed by a processor. Such instructions, when stored in non-transitory storage media accessible to processor, configure the computer system into a special-purpose machine that is customized to perform the operations specified in the instructions and provide or be capable of features and functionality described herein. The processes described herein can be implemented as computer instructions executable by the processor of a computer of computing device to performs described process steps the computer instructions can be saved on nonvolatile or nontransitory memory for providing such implementations.

The computer system further includes a read only memory (ROM) or other static storage device coupled to bus for storing static information and instructions for processor. A storage device, such as a magnetic disk or optical disk, is provided and coupled to bus for storing information and instructions.

The computer system may be coupled via bus to a display, such as an LCD, for displaying information to a computer user. An input device, including alphanumeric and other keys, may be coupled to bus for communicating information and command selections to processor. Another type of user input device is cursor control, such as a mouse, a trackball, touchscreen (e.g., on mobile phones) or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

The computer system may implement the techniques described herein using customized hard-wired logic, one or more ASICs or FPGAs, firmware and/or program logic which in combination with the computer system causes or programs computer system to provide specialized features. According to one embodiment, the techniques herein are performed by the computer system in response to the processor executing one or more sequences of one or more instructions contained in main memory. Such instructions may be read into main memory from another storage medium, such as storage device. Execution of the sequences of instructions contained in main memory causes the processor to perform the process steps described herein. In alternative embodiments, hard-wired circuitry may be used in place of or in combination with software instructions.

The term storage media as used herein refers to any non-transitory media that stores data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to the processor for execution. For example, the instructions may initially be carried on a magnetic disk or solid state drive of a remote computer. A bus carries the data to main memory, from which processor retrieves and executes the instructions. The instructions received by main memory may optionally be stored on storage device either before or after execution by the processor.

The computer system also includes a communication interface coupled to bus. The communication interface provides a two-way data communication coupling to a network link that is connected to a local network. For example, the communication interface may be an integrated services digital network (ISDN) card, cable modem, satellite modem, or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the worldwide packet data communication network now commonly referred to as the "Internet." Local network and Internet both use electrical, electromagnetic or optical signals that carry digital data streams. The signals through the various networks and the signals on network link and through the communication interface, which carry the digital data to and from the computer system, are example forms of transmission media.

The computer system can send messages and receive data, including program code, through the network(s), network link and the communication interface. In the Internet example, a server might transmit a requested code for an application program through Internet, ISP, local network and the communication interface.

The received code may be executed by the processor as it is received, and/or stored in storage device, or other non-volatile storage for later execution.

It should be understood that variations, clarifications, or modifications are contemplated. Applications of the technology to other fields are also contemplated.

Exemplary systems, devices, components, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It is understood from the above description that the functionality and features of the systems, devices, components, or methods of embodiments of the present invention include generating and sending signals to accomplish the actions.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

It should be understood that the above-described examples are merely illustrative of some of the many specific examples that represent the principles described herein. Clearly, those skilled in the art can readily devise numerous other arrangements without departing from the scope of the present invention.

What is claimed is:

1. A software development platform providing an integrated resource for design, development, and purchase of customer-desired software applications for software projects created by customers, comprising:
   one or more computers configured using computer readable instructions stored in non-transitory computer memory to provide the software development platform, wherein the software development platform is configured to implement a plurality of electronic operational domains providing user-interactive capabilities or internal functionalities of the software development platform, the domains comprising:
   a project scope process that is configured to provide a user with the ability through interactive display screens to specify and accept a scope for the software project, wherein as part of the project scope process through interactive screens the user creates a project and selects a plurality of features to be in the project;
   wherein the software development platform is configured to collect data from activity in the project scope process, pricing process, and project development process in accordance with the software development platform-defined graph data structures, wherein the graph data structures comprise a plurality of different types of nodes representing entities, the node types comprising template, project, and feature, each node type having a set of defined attributes, and different types of edges that represent interrelationship between entities;

wherein the software development platform is configured to generate and store a graph database comprising the nodes and edges created from the collected data in the operation of the software development platform and configured to reuse existing nodes and edges, add new nodes and edges, and adjust individual attributes of existing nodes and edges, wherein the graph database represents via nodes and edges an aggregation of the software projects conducted on the software development platform and related information and is updated to include new software projects using collected data;

wherein the software development platform is configured to include a knowledge graph process wherein the software development platform is configured to collect data and add nodes and edges to the graph database using the collected data, store the graph database in a first location, periodically perform a script that copies the graph database, loads the copied graph database to a second location and representing a knowledge graph, and interacts with the copied graph database as part of the operation of the software development platform to provide software tools based on the graph database; and wherein the software development platform is configured to, in response to a query of graph database, control one or more parts of the operation of the software development platform.

2. The software development platform of claim 1 wherein the software development platform is configured to traverse nodes and edges and stop travel to identify one or paths comprising connected node and edge paths in the graph database in accordance with a graph traversal algorithm, wherein the software development platform stops traversal when a criterion of the algorithm is not found.

3. The software development platform of claim 1 wherein the software development platform is configured, in response to the query, to control a user interaction in the project scoping process.

4. The software development platform of claim 1 wherein the software development platform is configured to include embedding generation that generates an embedding comprising a plurality of n-dimensional vectors that in accordance with an embedding algorithm represent the graph database, each n-dimensional vector corresponding to a node in the graph database and comprising vector values based on relationship to other nodes in the graph database.

5. The software development platform of claim 1 wherein the software development platform is configured to store a plurality of different hyper parameters corresponding to different software tools on the software development platform.

6. The software development platform of claim 5 wherein the software development platform is configured to control the embedding generation with the hyper parameters and generate different and store different embeddings corresponding to different software tools.

7. A non-transitory computer readable medium storing one or more software applications that causes a computer system to execute a method that implements a software development platform providing an integrated resource for design and development of customer-desired software applications, the method comprising:

implementing a plurality of electronic operational domains providing user-interactive capabilities or internal functionalities of the software development platform, the domains comprising:

a project scope process that is configured to provide a user with the ability through interactive display screens to specify and accept a scope for the software project, wherein as part of the project scope process through interactive screens the user creates a project and selects a plurality of features to be in the project;

collecting data from activity in the project scope process, pricing process, and project development process in accordance with the software development platform-defined graph data structures, wherein the graph data structures comprise a plurality of different types of nodes representing entities, the node types comprising template, project, and feature, each node type having a set of defined attributes, and different types of edges that represent interrelationship between entities;

generating and storing a graph database comprising the nodes and edges created from the collected data in the operation of the software development platform and reusing existing nodes and edges, add new nodes and edges, and adjusting individual attributes of existing nodes and edges, wherein the graph database represents via nodes and edges an aggregation of the software projects conducted on the software development platform and related information and is updated to include new software projects using collected data;

including a knowledge graph process wherein the software development platform is configured to collect data and add nodes and edges to the graph database using the collected data, store the graph database in a first location, periodically perform a script that copies the graph database, loads the copied graph database to a second location and representing a knowledge graph, and interacts with the copied graph database as part of the operation of the software development platform to provide software tools based on the graph database; and in response to a query of graph database, controlling one or more parts of the operation of the software development platform.

8. The non-transitory computer readable medium of claim 7 wherein the method further comprises traversing nodes and edges and stop travel to identify one or paths comprising connected node and edge paths in the graph database in accordance with a graph traversal algorithm, wherein the software development platform stops traversal when a criterion of the algorithm is not found.

9. The non-transitory computer readable medium of claim 7 wherein the method further comprises, in response to the query, controlling a user interaction in the project scoping process.

10. The non-transitory computer readable medium of claim 7 wherein the method further comprises including embedding generation that generates an embedding comprising a plurality of n-dimensional vectors that in accordance with an embedding algorithm represent the graph database, each n-dimensional vector corresponding to a node in the graph database and comprising vector values based on relationship to other nodes in the graph database.

11. The non-transitory computer readable medium of claim 10 wherein the method further comprises storing a plurality of different hyper parameters corresponding to different software tools on the software development platform.

12. The non-transitory computer readable medium of claim 11 wherein the method further comprises controlling the embedding generation with the hyper parameters and generate different and store different embeddings corresponding to different software tools.

13. A computer implemented method for a software development platform providing an integrated resource for design and development of customer-desired software applications, the method comprising:

implementing a plurality of electronic operational domains providing user-interactive capabilities or internal functionalities of the software development platform, the domains comprising:

a project scope process that is configured to provide a user with the ability through interactive display screens to specify and accept a scope for the software project, wherein as part of the project scope process through interactive screens the user creates a project and selects a plurality of features to be in the project;

collecting data from activity in the project scope process, pricing process, and project development process in accordance with the software development platform-defined graph data structures, wherein the graph data structures comprise a plurality of different types of nodes representing entities, the node types comprising template, project, and feature, each node type having a set of defined attributes, and different types of edges that represent interrelationship between entities;

generating and storing a graph database comprising the nodes and edges created from the collected data in the operation of the software development platform and reusing existing nodes and edges, add new nodes and edges, and adjusting individual attributes of existing nodes and edges, wherein the graph database represents via nodes and edges an aggregation of the software projects conducted on the software development platform and related information and is updated to include new software projects using collected data;

including a knowledge graph process wherein the software development platform is configured to collect data and add nodes and edges to the graph database using the collected data, store the graph database in a first location, periodically perform a script that copies the graph database, loads the copied graph database to a second location and representing a knowledge graph, and interacts with the copied graph database as part of the operation of the software development platform to provide software tools based on the graph database; and in response to a query of graph database, controlling one or more parts of the operation of the software development platform.

14. The computer implemented method of claim 13 further comprising traversing nodes and edges and stopping travel to identify one or paths comprising connected node and edge paths in the graph database in accordance with a graph traversal algorithm, wherein the software development platform stops traversal when a criterion of the algorithm is not found.

15. The computer implemented method of claim 13 further comprising, in response to the query, controlling a user interaction in the project scoping process.

16. The computer implemented method of claim 13 further comprising including embedding generation that generates an embedding comprising a plurality of n-dimensional vectors that in accordance with an embedding algorithm represent the graph database, each n-dimensional vector corresponding to a node in the graph database and comprising vector values based on relationship to other nodes in the graph database.

17. The computer implemented method of claim 16 further comprising storing a plurality of different hyper parameters corresponding to different software tools on the software development platform.

18. The computer implemented method of claim 17 further comprising controlling the embedding generation with the hyper parameters and generate different and store different embeddings corresponding to different software tools.

19. The computer implemented method of claim 13 further comprising generating and embedding using the knowledge graph.

20. The computer implemented method of claim 13 wherein further comprising providing one or services to the user of the software development platform using the knowledge graph.

* * * * *